US007418391B2

United States Patent
Gayama et al.

(10) Patent No.: US 7,418,391 B2
(45) Date of Patent: Aug. 26, 2008

(54) INTERACTIVE INFORMATION PROVIDING APPARATUS, INTERACTIVE INFORMATION PROVIDING PROGRAM, AND STORAGE MEDIUM HAVING STORED SAME

(75) Inventors: Shinichi Gayama, Tsurugashima (JP);
Yoshihiro Kawazoe, Tsurugashima (JP);
Hajime Kobayashi, Tsurugashima (JP);
Takehiko Shioda, Tsurugashima (JP);
Toshio Tabata, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 906 days.

(21) Appl. No.: 10/437,432

(22) Filed: May 14, 2003

(65) Prior Publication Data
US 2003/0217160 A1    Nov. 20, 2003

(30) Foreign Application Priority Data
May 16, 2002    (JP)    ............................ P2002-142192

(51) Int. Cl.
*G06F 17/30*    (2006.01)
*G10L 21/00*    (2006.01)
(52) U.S. Cl. ...................... 704/270.1; 704/270; 704/275
(58) Field of Classification Search ........................ None
See application file for complete search history.

(56) References Cited

U.S. PATENT DOCUMENTS

| 5,548,681 | A | * | 8/1996 | Gleaves et al. | ............. 704/233 |
|---|---|---|---|---|---|
| 5,774,860 | A | * | 6/1998 | Bayya et al. | ............. 704/275 |
| 5,822,743 | A | | 10/1998 | Gupta et al. | |
| 6,044,347 | A | * | 3/2000 | Abella et al. | ............. 704/272 |
| 6,236,968 | B1 | * | 5/2001 | Kanevsky et al. | ............. 704/275 |
| 6,647,363 | B2 | * | 11/2003 | Claassen | ............. 704/1 |
| 6,728,679 | B1 | * | 4/2004 | Strubbe et al. | ............. 704/270.1 |
| 6,885,990 | B1 | * | 4/2005 | Ohmori et al. | ............. 704/270 |
| 6,934,756 | B2 | * | 8/2005 | Maes | ............. 709/227 |
| 6,944,592 | B1 | * | 9/2005 | Pickering | ............. 704/251 |
| 2001/0032274 | A1 | | 10/2001 | Asami et al. | |
| 2002/0133355 | A1 | * | 9/2002 | Ross et al. | ............. 704/275 |

* cited by examiner

*Primary Examiner*—David R. Hudspeth
*Assistant Examiner*—Matthew J. Sked
(74) *Attorney, Agent, or Firm*—Nixon & Vanderhye, PC

(57) ABSTRACT

An interactive information providing apparatus is provided with: an output component that provides an information requesting output for requesting a user for information; an input component that receives from the user input information to the information requesting output; and an interaction controller component that controls the output component and the input component according to a scenario, to carry on a dialogue with the user. In the apparatus, the interaction controller component changes a level at which the output component requests a user for information, according to an importance parameter associated with the scenario.

18 Claims, 17 Drawing Sheets

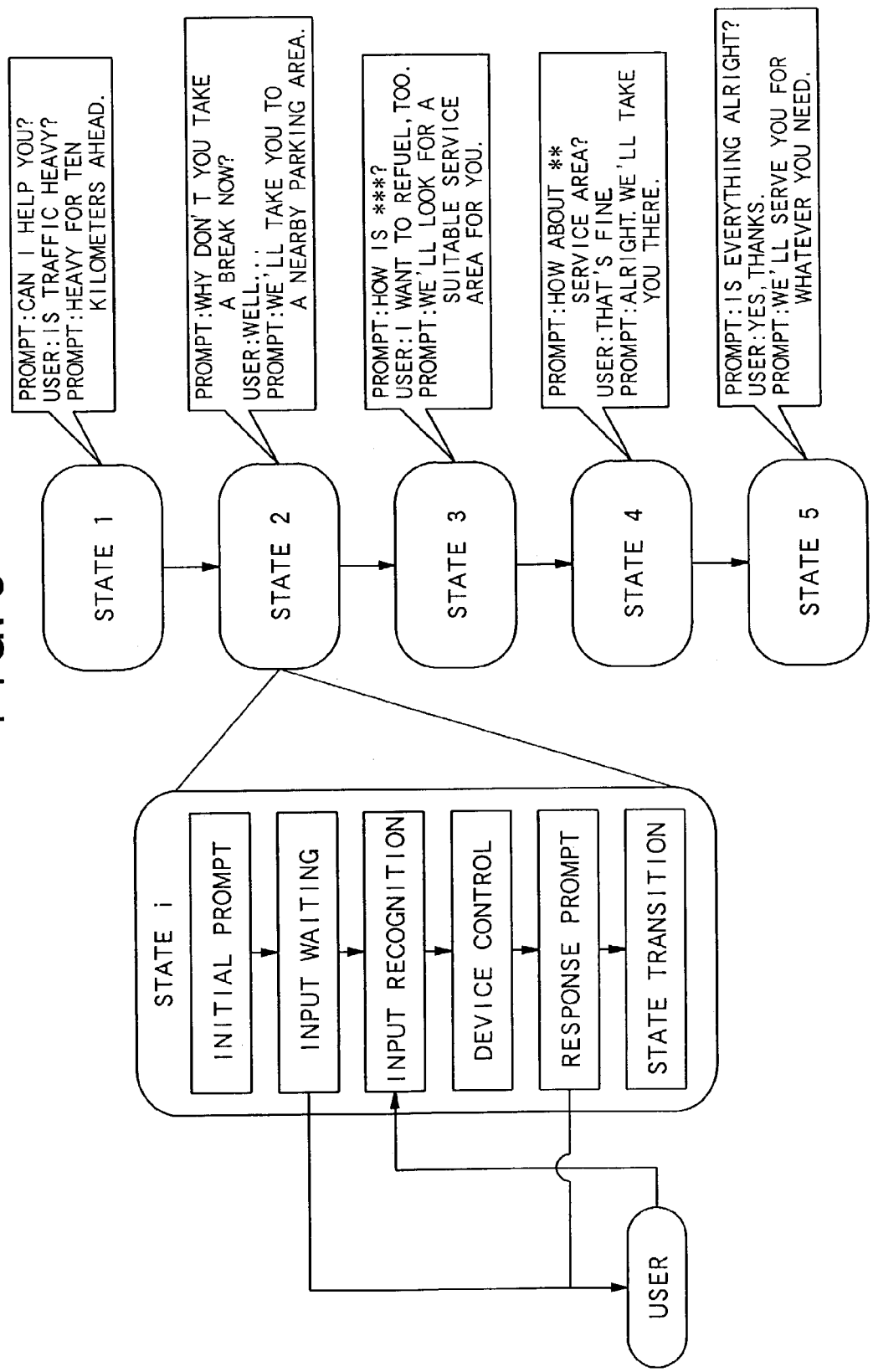

FIG. 5

(EXAMPLE SCENARIO 1)
11 USER:HOW'S TRAFFIC?
12 INTERACTION CONTROLLER:
    TRAFFIC JAM ** AHEAD.
13 USER:CALL HOME.
14 INTERACTION CONTROLLER:
    CERTAINLY. WE'LL CALL YOUR HOME.
    IS THAT OK?
15 USER:···
16 INTERACTION CONTROLLER:
    PLEASE ANSWER WITH"YES"OR"NO"
17 USER:OK. YES.
18 INTERACTION CONTROLLER:THANK YOU.
(EXAMPLE SCENARIO 2)
21 USER:VICS INFORMATION, PLEASE.
22 INTERACTION CONTROLLER:
    HOW WOULD YOU LIKE IT VIA FM OR
    BEACON?
23 USER:WELL, VIA BEACON, PLEASE.
24 INTERACTION CONTROLLER:
    WHICH WOULD YOU LIKE TEXT OR
    GRAPHICS?
25 USER:WELL,TEXT,PLEASE.
26 INTERACTION CONTROLLER:
    TRAFFIC JAM FOUR KILOMETERS AT
    NERIMA JUNCTION.
    WHERE ARE YOU GOING?
(EXAMPLE SCENARIO 3)
31 USER:VICS INFORMATION,PLEASE.
32 INTERACTION CONTROLLER:
    WE'LL GIVE YOU IN TEXT VIA BEACON.
    TRAFFIC JAM FOUR KILOMETERS
    AT NERIMA JUNCTION.
(EXAMPLE SCENARIO 4)
41 INTERACTION CONTROLLER:
    WHERE ARE YOU GOING?
42 USER:FOR SHOPPING.
43 INTERACTION CONTROLLER:
    WHAT ARE YOU GOING TO BUY?
44 USER:STATIONERY.
45 INTERACTION CONTROLLER:
    HOW ABOUT GOING TO XXX MART NEARBY?
46 USER:OK.
47 INTERACTION CONTROLLER:
    WE'LL TAKE YOU THERE.
(EXAMPLE SCENARIO 5)
51 INTERACTION CONTROLLER:
    WHERE ARE YOU GOING?
52 USER:I HAVEN'T DECIDED YET.
53 INTERACTION CONTROLLER:
    IT'S ABOUT TIME FOR LUNCH.
    HOW ABOUT GOING TO ABC PASTA
    WHERE YOU OFTEN HAVE LUNCH?
54 USER:YOU REALLY KNOW WHAT I LIKE.
    TAKE ME THERE.
55 INTERACTION CONTROLLER:
    WE'LL TAKE YOU THERE.
(EXAMPLE SCENARIO 6)
61 INTERACTION CONTROLLER:
62 USER:···
63 INTERACTION CONTROLLER:
    IT'S FINE TODAY.HOW ABOUT LISTENING
    TO SOME POP MUSIC?
    WE'VE PREPARED A PLAY LIST
    WITH OUR MUSIC SERVER FUNCTION.
65 USER:PLAY SOME.
66 INTERACTION CONTROLLER:HERE YOU GO.
    THE LATEST INFORMATION:**.

(USER)

CAR NAVIGATION UNIT

DEVICE INFORMATION
·TRAVEL LOG
AROUND NOON:
WAKABA ABC PASTA:
10 TIMES
CURRENT GEOGRAPHICAL
POSITION
6-1-2, FUJIMI,
TSURUGAOKA-SHI
·TIME:11:20 AM
·SEASON:SPRING

USER INFORMATION
·PERSONAL INFORMATION
RESIDENCE:
TELEPHONE NUMBER
·HISTORY
DESTINATION:
ANSWERED 2 TIMES
TRAFFIC INFORMATION:
REQUESTED 2 TIMES
TELEPHONE:
CALLED 1 TIME
PREFERENCES
 (TRAFFIC INFORMATION:
BEACON,TEXT)
MUSIC:POPS
RESTAURANT:ITALIAN,
ABC PASTA

FIG. 6

| USE | DEVICE-SPECIFIC INFORMATION ||||| USER INFORMATION |||| IMPORTANCE PARAMETER ADJUSTMENT CONDITION |
| --- | --- | --- | --- | --- | --- | --- | --- | --- |
| | SEASON | TIME | TRAVEL POSITION | TRAVEL SPEED/TIME | HOBBIES | HISTORY | INFORMATION | |
| REST FACILITIES GUIDANCE/ GALLERY GUIDANCE | SUMMER | DAYTIME | SIGHT SEEING SPOT | (NONE), LONG | ART | ART, MUSIC, HISTORY | STUDENT, SINGLE | AVERAGING OF NUMBER OF INFORMATION ITEMS RELATING TO MULTIPLE INDEXES |
| REST FACILITIES GUIDANCE/ NEARBY POINTS OF INTEREST | SPRING, AUTUMN | EARLY MORNING, DAYTIME, NIGHT | SIGHT SEEING SPOT | (NONE), LONG | TRIP, DRIVING | CHERRY BLOSSOM VIEWING, CAMPING, HOT-SPRING CURE | SENIOR CITIZEN, FAMILY | AVERAGING OF NUMBER OF INFORMATION ITEMS RELATING TO MULTIPLE INDEXES |
| REST FACILITIES GUIDANCE | NONE | NONE | EXPRESSWAY | FAST (HIGH SPEED), LONG | GASTRONOMY | SERVICE AREAS, FIRST-CLASS JAPANESE RESTAURANTS, RESTAURANTS | NONE | AVERAGING OF NUMBER OF INFORMATION ITEMS RELATING TO MULTIPLE INDEXES |
| TRAFFIC INFORMATION GUIDANCE | NONE | NONE | STREET EXPRESSWAY | SLOW (CONGESTION), LONG | NONE | NONE | NONE | TRAVEL SPEED AND DURATION OF HIGH-SPEED TRAVELLING |
| MUSIC GUIDANCE | NONE | NONE | NONE | NONE, LONG | MUSIC, MUSICAL INSTRUMENTS | JAPANESE POPS, NOSTALGIC NUMBERS, BALLADS | MALE, TWENTIES | AMOUNT OF MUSIC PREFERENCES STORED AND VARIANCE OF THEIR VALUES |

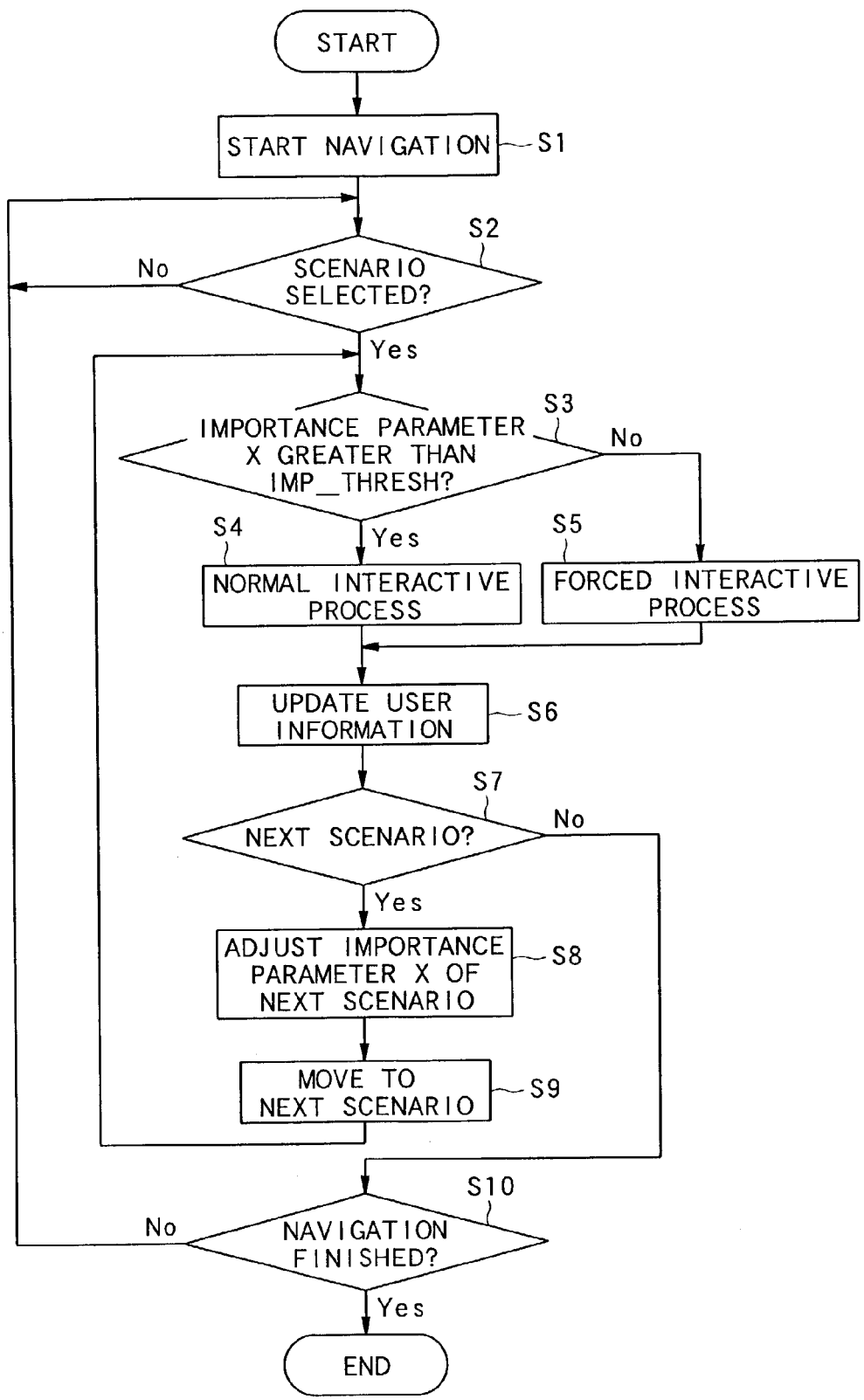

INTERACTIVE INFORMATION PROVIDING APPARATUS, INTERACTIVE INFORMATION PROVIDING PROGRAM, AND STORAGE MEDIUM HAVING STORED SAME

BACKGROUND OF THE INVENTION

1. Field of the Invention

The present invention relates to an interactive information providing apparatus well adapted to, for example, an in-vehicle information terminal equipped with a navigation unit.

2. Description of Related Art

In traditional information processing apparatuses including ticket machines and car navigation devices, which are provided with input/output mechanisms such as keys and/or voice, input/output operations must be performed successively when a user wishes to use one or more of their functions. To do so, a program within the information providing apparatus executes interactive input/output operation with a user through passage from one state to another, each state comprising a series of operations of receiving input from the user, acquiring information necessary for the apparatus to perform its function(s), controlling the apparatus, and indicating the progress or result of the state. When viewed from the user, this passage from one state to another could be perceived as an interactive scenario involving exchange of information between the user and the apparatus to achieve an objective. The apparatus has many prepared scenarios corresponding to many of its service functions, and the user inputs commands and information as requested by the apparatus to carry on the interactive scenario(s) to utilize these functions.

The information providing apparatus that executes an interactive scenario prompts the user for appropriate input so that the apparatus can reliably perform particular operation using visual and vocal information in a dialogue involved. If the user input is appropriate, the apparatus moves on to a next scenario. If not, the apparatus does not respond at all or keeps on prompting the user for appropriate input. That is, in a dialogue between the user and the apparatus, it is the apparatus that dictates the major part of the dialogue. The user must always give responses as appropriate as the apparatus so requires, and the apparatus refuses any of them to abort the interaction, unless the user response is appropriate. This scheme of processing interactions which demands appropriate user inputs could be positively evaluated as being easy to operate. However, as the user uses the apparatus more often, a high incidence of input error by the user and of recognition failure by the apparatus occurs to annoy the user, and interactive scenarios also bore the user when played repeatedly. Thus, there is a need to eliminate these shortcomings.

SUMMARY OF THE INVENTION

In order to satisfy the above and other needs, the present invention provides an interactive information providing apparatus capable of even processing a dialogue with a user while accepting unclear user inputs according to situations.

In one aspect of an interactive information providing apparatus of the present invention is provided with: an output component that provides an information requesting output for requesting a user for information; an input component that receives from the user input information to the information requesting output; and an interaction controller component that controls the output component and the input component according to a scenario, to carry on a dialogue with the user, wherein the interaction controller component changes a level at which the output component requests a user for information, according to an importance parameter associated with the scenario.

The interactive information providing apparatus comprises an output component that provides a user with an information requesting output and an input component that receives input information from the user to have a dialogue with the user via operation of these components. The input component may include, for example, a microphone through which the user can input information vocally. The output component may include, for example, a voice output component and speakers for reproducing pre-recorded voice prompts.

A dialogue between the user and the interactive information providing apparatus is carried on according to one or more pre-arranged scenarios. That is, a dialogue starts and proceeds according to a scenario as the information providing apparatus repeats the steps of causing its output component to provide an information requesting output, and receiving and processing input information from the user. Each scenario is associated with an importance parameter defined according to its content, etc. The importance parameter of a scenario indicates how accurately and strictly the apparatus requests the user for information when the apparatus executes the scenario. During execution of a scenario, a level at which the output component requests the user for information is varied, to control the information requesting output provided by the output component according to the resultant level. This permits an interaction to proceed while requesting user information at an appropriate level tailored to the content, property, or other features of the scenario. It should be appreciated that "a scenario" is defined as information that regulates the progress of a dialogue. If a single scenario comprises a plurality of "states", then "the scenario" would be interpreted as including "any of the states".

In another aspect of the interactive information providing apparatus of the present invention, the interaction controller component controls the output component such that the output component requests a user for more information when the importance parameter is above a predetermined threshold than when the importance parameter is below the threshold.

This allows an interactive scenario involving some vital processing to be executed strictly such that the vital processing will be performed only when clear user responses are received. Also, for an interactive scenario that is less important operation, this permits the level at which to request a user for information to be reduced so that the information providing apparatus can push the interaction forward to some extent.

In further aspect of the interactive information providing apparatus of the present invention, the interaction controller component controls the output component such that the output component provides the information requesting output more times when the importance parameter is above a predetermined threshold than when the importance parameter is below the threshold.

In further aspect of the interactive information providing apparatus of the present invention, the input component comprises: a recognition device which recognizes the input information and outputting a recognition result; a decision device which determines whether or not the recognition result coincides with expected information prepared to correspond to the information requesting output; and a repeating device which causes the output component to repeat the information requesting output when the recognition result does not coincide with the expected information, wherein the interaction controller component increases a frequency at which the repeating means repeats the information requesting output, when the importance parameter is above a predetermined threshold.

According to this aspect, the information providing apparatus has pre-arranged, expected information in order to hold a dialogue with a user when requesting the user for some information. If the input information from the user is recognized as not coinciding with the expected information, the apparatus can repeat its information requesting output until they coincide with each other. When the importance parameter is large, the number of times the information requesting output is repeated is increased, so that the input information from the user is checked until it matches with any expected word. Thus, for scenarios including ones involving important manipulation such as control of a device, it is designed that a scenario can proceed on condition that user instructions or the like are confirmed, to ensure reliable processing.

In further aspect of the interactive information providing apparatus of the present invention, the input component comprises: a recognition device which recognizes the input information and outputting a recognition result; and a decision device which determines whether or not the recognition result coincides with expected information prepared to correspond to the information requesting output, wherein the interaction controller component carries on the dialogue when the importance parameter is below the threshold, despite the recognition result not coinciding with the expected information. This permits a dialogue to be carried on in a forced manner without rigid recognition of user's input information when the importance parameter is small, to ensure that the dialogue will continue.

In further aspect of the interactive information providing apparatus of the present invention, the interaction controller component carries on the dialogue when the importance parameter is below the threshold, despite the input component receiving no input information from the user. This permits a dialogue to be carried on in a forced manner without rigid recognition of user's input information when the importance parameter is small, to ensure that the dialogue will continue.

In further aspect of the interactive information providing apparatus of the present invention, the apparatus comprises a first storage component that stores, as user information, input information to the information requesting output, entered by the user in the past; and a second storage component that stores device-specific information related to a condition of the information providing apparatus, wherein the interaction controller carries on the dialogue based on the user information and/or the device-specific information. This permits a dialogue to be carried on in a forced manner through the use of user information which a user inputted in the past and device-specific information related to the status of the information providing apparatus.

In further aspect of the interactive information providing apparatus of the present invention, the interaction controller component changes a degree to which the dialogue is carried on based on the user information and/or the device-specific information, when the importance parameter is below the threshold. This permits proper control over a degree to which a dialogue is pushed forward utilizing the user information and/or device-specific information, according to an importance parameter value. Thus, when the importance parameter is small, the number of iterations which is performed to request the user for information is decreased to allow more of the user information and/or device-specific information to be utilized to continue the dialogue in a forced way.

In further aspect of the interactive information providing apparatus of the present invention, the apparatus comprises a first storage component that stores, as user information, input information to the information requesting output, entered by the user in the past; a second storage component that stores device-specific information related to a condition of the information providing apparatus; and an adjustment device which adjusts a value of the importance parameter based on the user information and/or the device-specific information. According to this aspect, importance parameters can be adjusted properly based on user information related to the user's input information of the past and device specific information related to the current conditions of the apparatus, etc., whereby a dialogue can be processed in a manner tailored to situations involved at the time of its processing.

In further aspect of the interactive information providing apparatus of the present invention, the adjustment device adjusts the value of the importance parameter according to a frequency at which the dialogue has been carried on according to the scenario in the past.

In further aspect of the interactive information providing apparatus of the present invention, the user information comprises input information entered by the user to the navigation unit, and the device-specific information comprises current time data, current position data, and travel history data. This permits a user of a navigation unit to properly adjust importance parameters by use of the user information and/or device-specific information including his or her usage history.

The above-mentioned interactive information providing apparatus can be realized by causing a computer to execute the interactive information providing program.

BRIEF DESCRIPTION OF THE DRAWINGS

FIG. 3 shows an example of how a scenario for interaction control is composed;

FIG. 5 shows specific examples of scenarios;

FIG. 6 is a table listing elements and conditions for adjustment of importance parameters, by way of example;

FIG. 7 is a flowchart showing a main routine of an interaction control process;

DESCRIPTION OF THE PREFERRED EMBODIMENTS

Preferred embodiments of the present invention will now be described with reference to the attached drawings.

In-Vehicle Information Terminal

Figure 1:
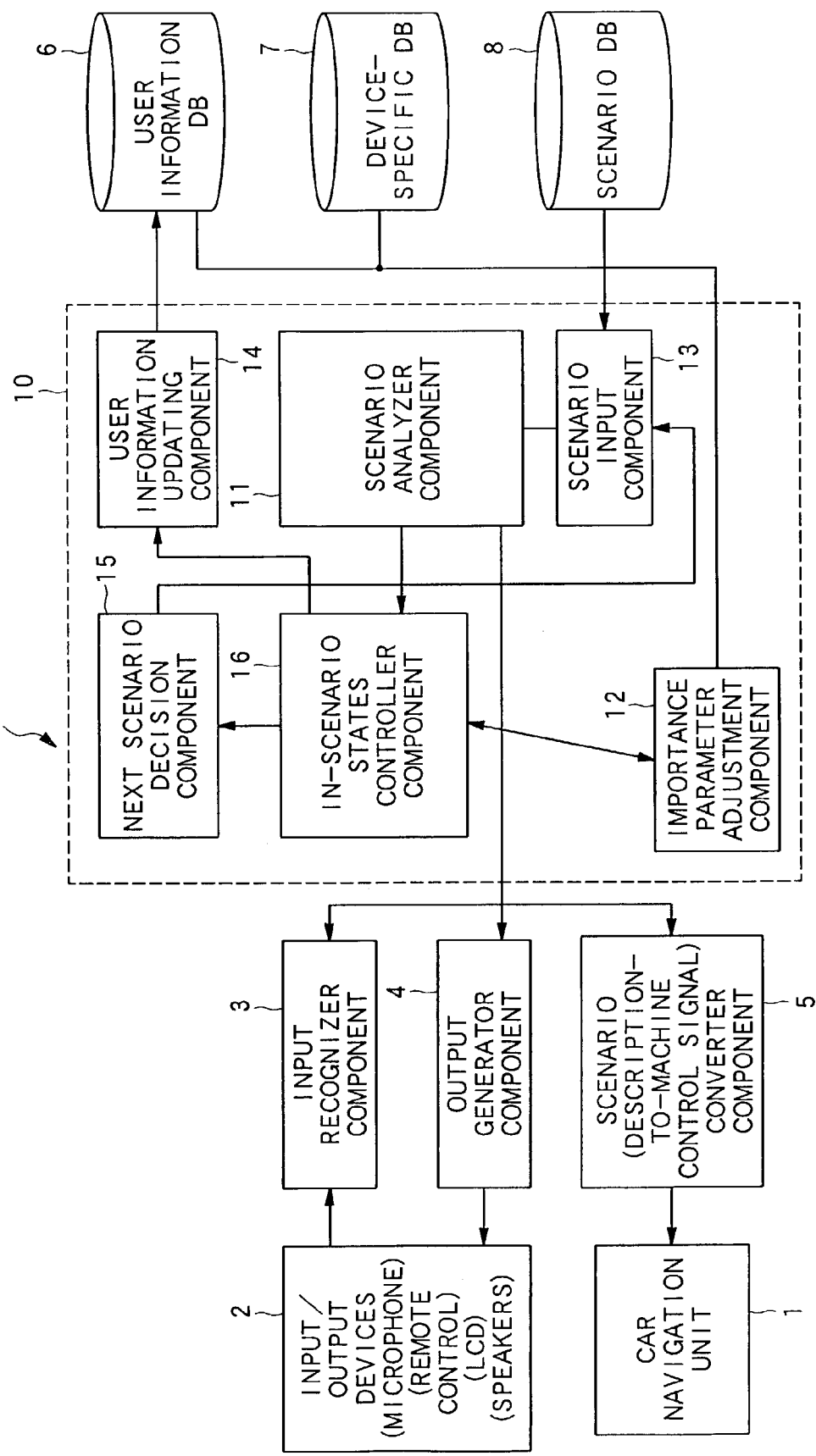
FIG. 1 is a block diagram illustrating a configuration of an in-vehicle information terminal to which the present invention is applied.

FIG. 1 illustrates functional blocks of an in-vehicle information terminal according to an embodiment of the present invention. As shown in the figure, an in-vehicle information terminal 100, mounted on an automobile or the like, has a car navigation function, can provide a user with music, video and other information, and also is interactive with the user via input/output equipment.

In FIG. 1, the in-vehicle information terminal 100 comprises a car navigation unit 1, input/output equipment 2, an input recognizer component 3, an output generator component 4, a scenario description-to-machine control signal converter component 5, a user information database (DB) 6, a device-specific information DB 7, a scenario DB 8, and an interaction controller 10.

The car navigation unit 1 provides a user with maps, renders navigational services such as route searching and route guidance to specific destinations, and is provided with electronics such as various sensors (not shown) and a GPS (Global Positioning System) unit (not shown).

The input/output equipment 2 includes a microphone, a remote control, etc. as input devices, and speakers, a liquid crystal display (LCD), etc. as output devices. In an interaction control process to be described below, a user enters commands and information by speaking to the microphone to have a dialogue with voice prompts output from the speakers.

The input recognizer component 3 receives via the microphone voice data corresponding to utterances spoken by the user, performs a speech recognition process to recognize what the user spoke, and supplies the recognition result to the interaction controller 10. The output generator component 4 converts each voice prompt from the interaction controller 10 into a voice signal for subsequent output through the speakers. The scenario description-to-machine control signal converter component 5 generates a machine control signal corresponding to a description of a scenario (to be described below) and supplies the generated signal to the car navigation unit 1. Responsive to the signal, the car navigation unit 1 operates according to the scenario.

Figure 2A:
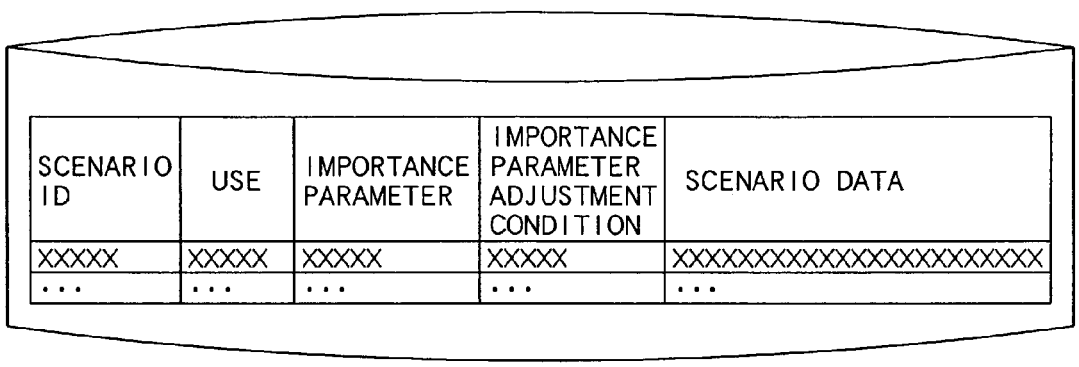
FIG. 2A shows an example of data stored in each database illustrated in FIG. 1.
Figure 2B:
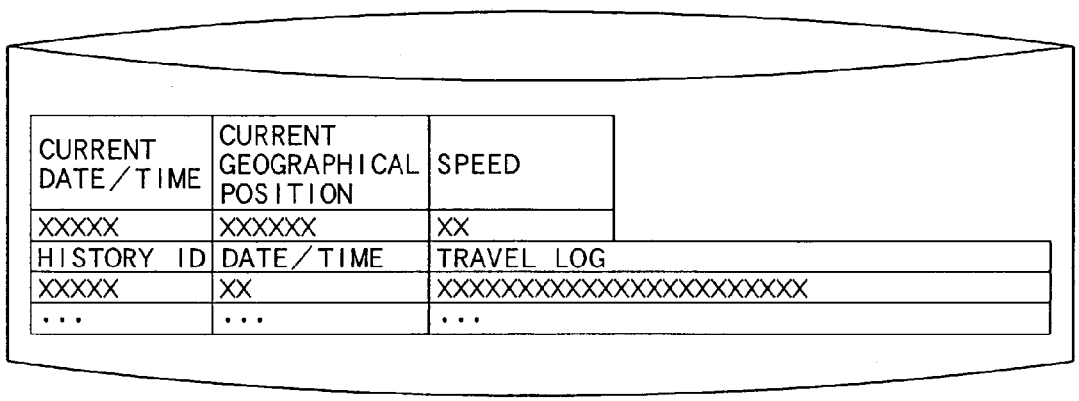
FIG. 2B shows another example of data stored in each database illustrated in FIG. 1.
Figure 2C:
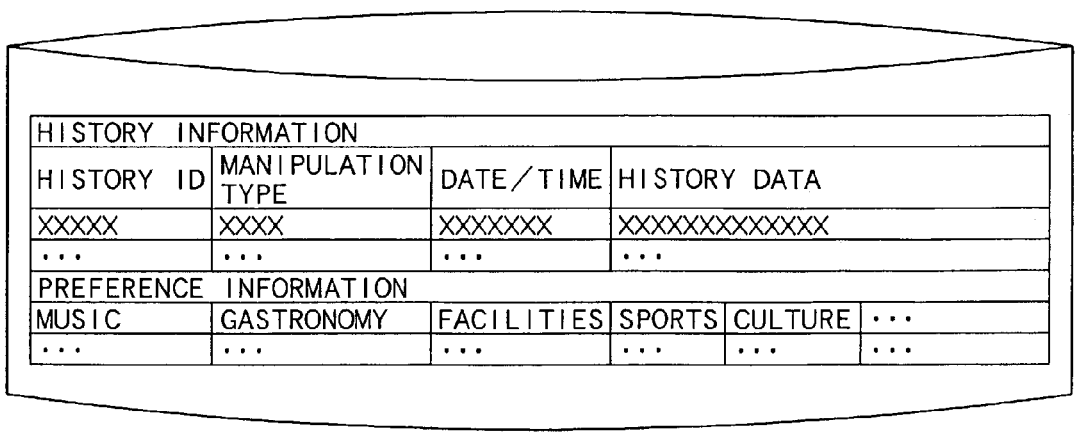
FIG. 2C shows another example of data stored in each database illustrated in FIG. 1.

The user information DB 6 stores personal and other information about a user of the in-vehicle information unit 100. FIG. 2C presents some example data recorded in this database 6, which includes user-associated history data on usage of the information terminal 100. Specifically, every time a user manipulates the terminal 100, a history ID is given to that user in association with the type of manipulation, when and how the terminal 100 is used, and other relevant data. User preferences are also added against each user, which are classified under the headings, such as music, gastronomy, facilities, sports, culture, etc.

The device-specific information DB 7 accumulates information unique to the in-vehicle information unit 100. FIG. 2B shows some exemplary entries in the device-specific information DB 7, which are related to information about a vehicle the terminal 100 is installed on, such as current date/time, current geographical position, and speed. Also, every time the vehicle travels, a history ID is given to record its travel history such as travel date/time and travel log (in which travel areas, destinations, and transit areas are recorded, for example).

The scenario DB 8 collects scenarios each of which comprises control data allowing a user to interact with the interaction controller 10. Shown in FIG. 2A are some data corresponding to many scenarios used for communication with the user. Specifically, the data saved in the scenario DB 8 includes, as arranged according to their scenario ID, the intended use of a scenario, the importance parameter of a scenario, conditions for adjusting an importance parameter, and scenario data. The intended use of a scenario is herein defined as indicating what type of dialogue the scenario is to be used for. The importance parameter of a scenario means an index of importance referenced by the controller 10 in requesting a user for particular information in order to perform interaction according to the scenario. For example, the importance parameter is referenced to determine whether a normal or a forced interactive process is to be invoked. An importance parameter adjustment condition is used to adjust an importance parameter value based on assorted importance parameter adjustment elements to be described below. It is to note that the importance parameter is a major feature of the invention and hence will be more fully described below.

The interaction controller 10 comprises, as shown in FIG. 1, a scenario analyzer component 11, an importance parameter adjustment component 12, a scenario input component 13, a user information updating component 14, a next scenario decision component 15, and an in-scenario states controller component 16.

The scenario input component 13 fetches scenario data from the scenario DB 8 and passes it to the scenario analyzer component 11, which then analyzes and executes it. If a scenario requires some output such as voice prompts, the scenario analyzer component 11 supplies the voice prompts to the output generator component 4 for proper interaction according to the scenario.

The in-scenario states controller component 16 detects a change from the current state during a scenario-based interaction performed by the scenario analyzer component 11, and transfers the result to the next scenario decision component 15, which decides a scenario to be invoked next and informs the scenario input component 13 of the decision made. Responsive thereto, the scenario input section 13 accesses the scenario DB 8 to retrieve the next scenario data in question.

The importance parameter adjustment component 12 adjusts an importance parameter value based on information including state transitions in a scenario in progress, user information in the user information DB 6, and device-specific information in the device-specific information DB 7. The user information updating component 14 changes information in or adds new information to the user information DB 6 according to any transition from one state to another in an ongoing scenario, which transition is learned from the in-scenario states controller component 16.

It is appreciated that the above components are operated by a processor, etc. of the in-vehicle information terminal executing pre-selected programs. That is, when equipped with a computer, an in-vehicle information terminal, which is a preferred embodiment of an information providing apparatus according to the invention, can be implemented by causing the computer to execute pre-arranged information providing programs, etc.

Scenarios

Scenarios will now be described. A scenario regulates flow of a dialogue between a user and the interaction controller 10 of the in-vehicle information terminal 100, and comprises scenario data. FIG. 3 shows an example of a single scenario that is made up of a plurality of "states" so that the scenario proceeds by transition from one state to another. It will be appreciated that a scenario could comprise various types of state transitions, so simple as serial as shown in FIG. 3, or very complex with many branches.

A state, which is an element of a scenario, basically includes, as shown in FIG. 3, an initial prompt phase, an input waiting phase, an input recognition phase, a device control phase, a response prompt phase, and a state transition phase. That is, a state includes a pre-arranged voice query (initial prompt) to a user from the interaction controller 10. More specifically, first, the interaction controller 10 prompts a user with a query, and waits for an input (response) from the user about the query. Receiving an input from the user, the controller 10 identifies the input, controls a device such as the car navigation unit according to what is identified, and plays back a response prompt to the user. When one state ends in this way, the interaction controller 10 moves to another state.

Each of the example states 1 though 5 of FIG. 3 is basic in structure, as mentioned above, beginning with an initial voice prompt from the interaction controller 10 which is ten followed by a spoken input from a user and a response voice prompt from the controller 10. In some states, such a prompt/input session may repeat between the controller 10 and the user. In other states, device control would start immediately with no input requested to the user.

Figure 4:
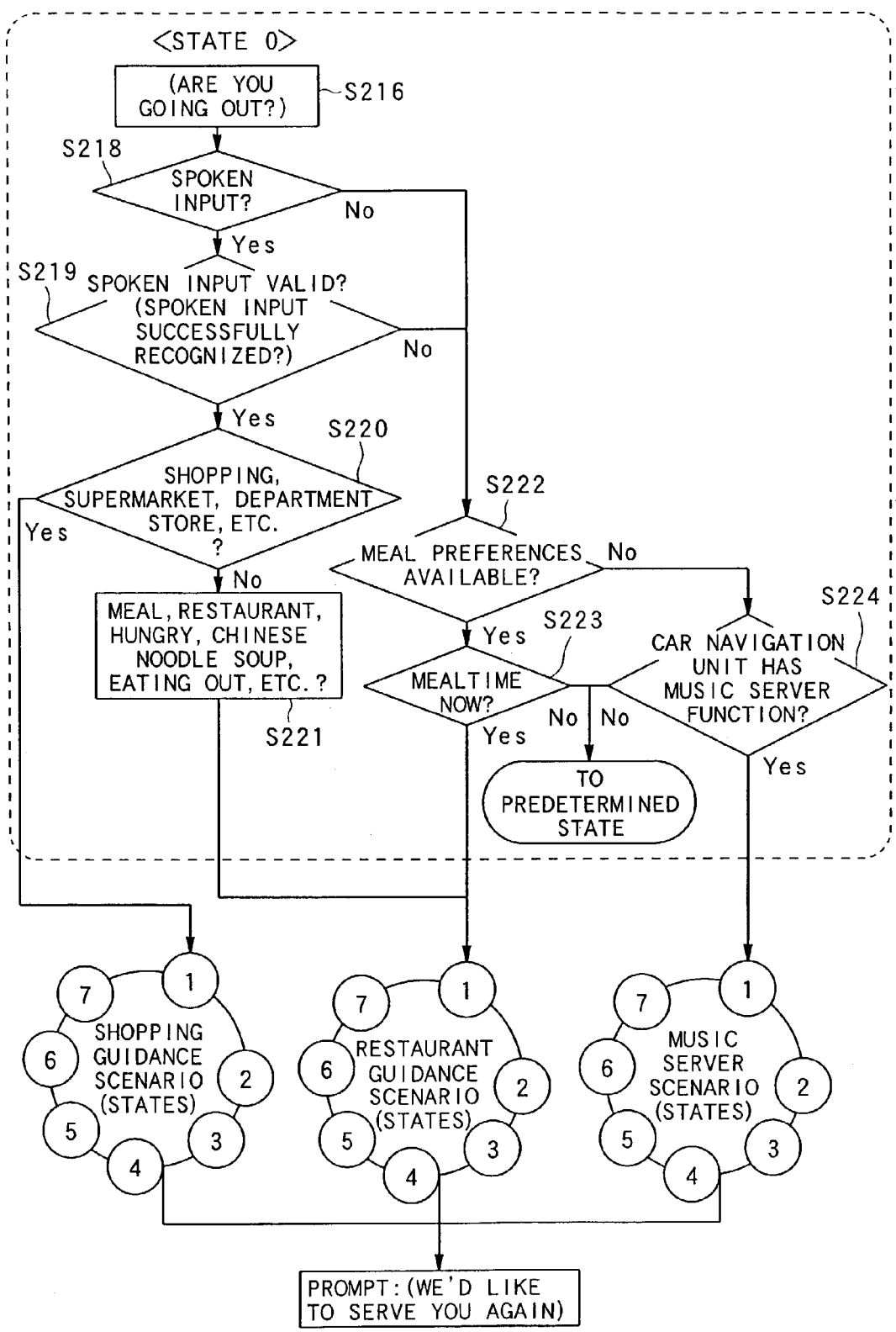
FIG. 4 shows an example of a state which is a component of a scenario.

FIG. 4 shows an example of a relatively complex state ("state 0").

First, in step S216, the interaction controller 10 outputs a voice message such as "Where are you going?" as an initial prompt, and waits for a response from a user. When receiving a spoken input from the user (YES in step S218), the controller 10 checks if the input speech received is valid (step S219). In step S218, the interaction controller 10 is waiting to receive any of prepared words it expects the user to speak as his or her response to the initial prompt played in step S216. In step S219, a comparison is made between the recognition result of the actual input speech and any prepared word. If both are in agreement, the input speech is determined to be valid, and otherwise, it is determined to be invalid.

If the input speech is valid (YES in step S219), the interaction controller 10 further determines if any of words relevant to shopping, such as "shopping", "supermarket", or "department store" is identified (step S220). If any such word is identified, the controller 10 leaves the current state to move to state 1 of a prepared shopping guidance scenario.

If, on the other hand, the input speech includes no word relevant to shopping (NO in step S220), then the interaction controller 10 checks if a word such as "meal", "restaurant", "hungry", "Chinese needle soup", or "eating out" is recognized (step S221). If such a word is recognized, the controller 10 moves from the current state to state 1 of a pre-arranged restaurant guidance scenario.

If the user remains silent (NO in step S218) or if the words uttered by the user cannot be recognized accurately enough (NO in step S219), then the interaction controller 10 accesses the user information DB 6 to look for some user's meal preferences (step S222). If suitable meal preference data is found, the controller 10 checks whether the current time is a mealtime (step S223). If the current time is a mealtime, the controller 10 is allowed to proceed to state 1 of the restaurant guidance scenario.

If, on the other hand, neither meal preferences are found in the user information DB 6 (NO in step S222) nor is the current time a mealtime (NO in step S223), then the interaction controller 10 checks if the car navigation unit 1 of the in-vehicle information terminal 100 has a music server function (step S224). If such a function is available, the controller 10 changes state 0 to state 1 of a prepared music server scenario. Otherwise, the controller 10 proceeds to a predetermined state.

In this way, each scenario is executed properly in accordance with the presence and the content of a user response (vocal input) to an initial prompt. Once a particular scenario ends, the interaction controller 10 provides a regular voice prompt ("We'd like to serve you again." or the like) to terminate the execution of that scenario.

As seen from the example state 0 shown in FIG. 4, the invention has a feature that a scenario can be carried forward in a forced manner by finding some suitable information in the user information DB 6, device-specific information DB 7, etc. not only when a user does speak an expected word but also when a user speaks a word different from an expected one or no word at all. A typical interaction control device designed for car navigation applications or the like is arranged such that unless an expected word is received from a user (NO in step S218 or S219), the user is repeatedly urged to speak or confirm a spoken word until the expected word is detected in his or her spoken input includes the expected word. However, whether it would be appropriate to do so for clear and definite recognition of user response by the controller 10 depends on the property of a scenario, the current and other situations involved, etc. For example, it would be necessary for the interaction controller 10 to correctly recognize and understand user responses or instructions to its voice prompts when these responses or instructions are related to some important manipulation of the car navigation unit or the automobile itself, in order to perform the manipulation properly as instructed. On the other hand, if an initial prompt from the controller 10 is not so important, situations where a user utters unrecognizable words or no word could be accommodated in one way or another to continue the in-process dialogue, and the user would also feel comfortable and advantageous when so treated.

In view of this, the present invention introduces the concept of an importance parameter that indicates a degree of importance of a scenario. That is, the importance parameter of a scenario (hereinafter denoted as "X" whenever applicable) is indexed to user input based on how strictly the user input is requested in executing the scenario, and in specific terms, can be fixed considering factors such as whether the scenario is so important as being related to control over the car navigation unit or the automobile itself or is not so important. More specifically, a large importance parameter X is set for a scenario that would demand accurate recognition of user input to continue proper interaction, whereas a small importance parameter X is set for a scenario whose content would be less important so that the scenario could be pushed onward resourcefully to some extent by use of, for example, user and/or device-specific information so far available, even when the user gives unclear responses or no response.

Some scenarios are shown, by way of example, in FIG. 5 in relation to their importance parameters. On the right side of the figure are examples of device-specific and user information stored in the device-specific and user information DBs 7 and 6, respectively, for a particular user who is involved in a state of each of the scenarios, which are listed on the left side roughly in order of importance; i.e., scenario 1 is higher and scenario 6 is lower in their importance.

In scenario 1, the interaction controller 10 is requested to assist the user in calling home after having informed him or her of latest traffic conditions. In accordance with this scenario, the controller 10 checks with the user to make sure that it can call the user's home. If the user is vague or indecisive to the controller's check, the interaction controller 10 may likely make an otherwise unnecessary call or fail to make an otherwise necessary call. To avoid this likelihood, scenario 1 is fixed at a high parameter value that causes the controller 10 to request user response as many times as necessary until the user does confirm his or her response, before keeping the scenario going.

Scenario 2 is invoked when the user needs some VICS information (information about traffic conditions), asking the user to choose how the information is to be provided (by FM multiplex broadcasting or beacons, or in text or graphics). In this example, the scenario proceeds through a basic dialogue in which the user answers to a query from the controller 10. Hence, scenario 2 is given a value X equal to or somewhat smaller than scenario 1.

Scenario 3 is similar to scenario 2 as it allows the user to request VICS information, but is less important than scenario 2. Thus, the interaction controller 10 accesses the device-specific information DB 7 to find any user history data indicating that he or she has requested VICS information in the past, and provides the requested VICS information in text via a beacon based on that history data.

Scenario 4 is being executed in a basic interactive manner similar to scenario 2. Words such as "shopping" and "stationery" in the user's response matches with certain pre-selected words; i.e., the user's response is quite close to what is expected by the interaction controller 10. Thus, scenario 4 has substantially the same importance parameter X as scenario 2.

In Scenario 5, to the initial voice prompt "where are you going?" from the interaction controller 10, the user replies vaguely by saying "Well, I haven't decided yet". From the context of the scenario, the interaction controller 10 does not need a specific destination, and thus the importance parameter X is set to a relatively small value. Hence, the controller 10, in accordance with the current time and the name of a restaurant found as the user's preference data included in the user information, suggests that the user go to that restaurant.

In Scenario 6, the user remains silent to the same initial prompt "where are you going?". Since this scenario, in view of its content, does not need any specific destination and hence its importance parameter may be set at a relatively small value, the interaction controller 10 proposes that the user play some music.

If example scenarios 5 and 6 had large importance parameters X, then the user would have to be asked about the destination again and again as in typical car navigation equipment. However, due to their properties, specifying a destination is not a matter of importance, but the point of the scenarios is to engage the user in a dialogue. Thus, despite unclear, indecisive responses or no response, these scenarios should further be executed by referencing relevant user/device-specific information, and such processing would also be to the user's advantage.

As described above, since each scenario has its importance parameter measured in accordance with its content or property, the interaction controller 10 can properly decide whether to play a scenario with definite user responses or push a scenario even with somewhat unclear user responses or even without user response.

The present invention has another feature that the importance parameter can be changed as necessary. Basically, each scenario is given a default importance parameter value, but it would be desirable that the default value be adjusted based on user and/or device-specific information available at the time the scenario is played. For example, the above example scenario 3 could be executed utilizing user preference data about the above-mentioned VICS information providing method if available as the user and/or device-specific information, and therefore, unless a scenario is so vital as to involve manipulation of the navigation unit or the automobile and thus requiring rigid user confirmation (e.g., example scenario 1 of FIG. 5), its default parameter can be lowered to some degree. In this way, each scenario has its default importance parameter value specified based on its content, and this default can be tuned later in accordance with situations at the time of playing the scenario, so that the controller 10 can proceed with the scenario using an optimally tuned importance parameter.

A table of FIG. 6 shows exemplary elements through which to adjust importance parameters X. In the figure, intended uses of scenarios (see example data entries in the scenario DB of FIG. 2A) are used as keys to selecting suitable items of device-specific and user information. The entries under the heading "importance parameter adjustment conditions" indicate methods for numerically adjusting an important parameter, details of which will be described further below.

Interaction Control Process

Figure 8:
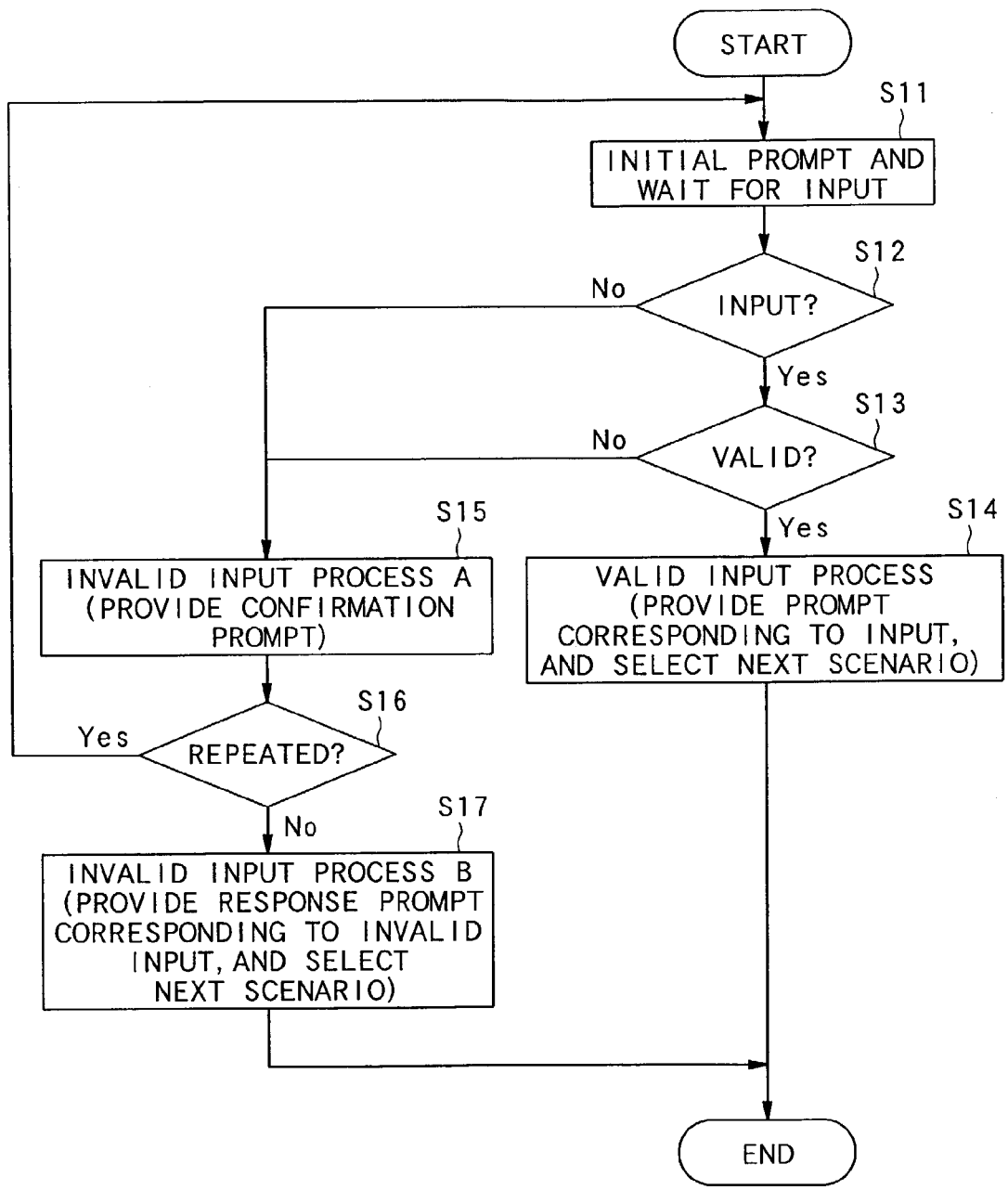
FIG. 8 is a flowchart for a normal interactive process of FIG. 7.
Figure 9:
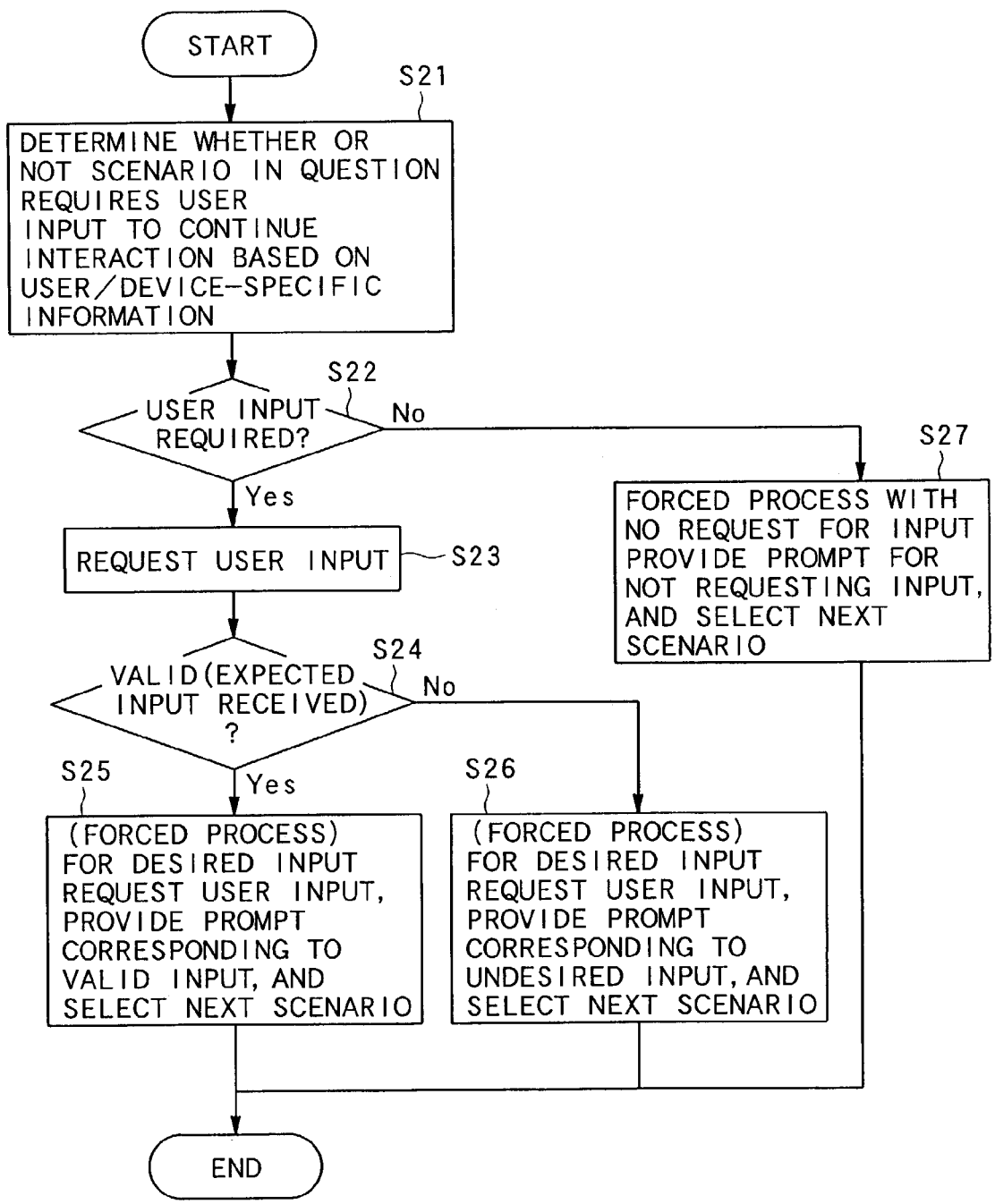
FIG. 9 is a flowchart for a forced interactive process of FIG. 7.
Figure 10:
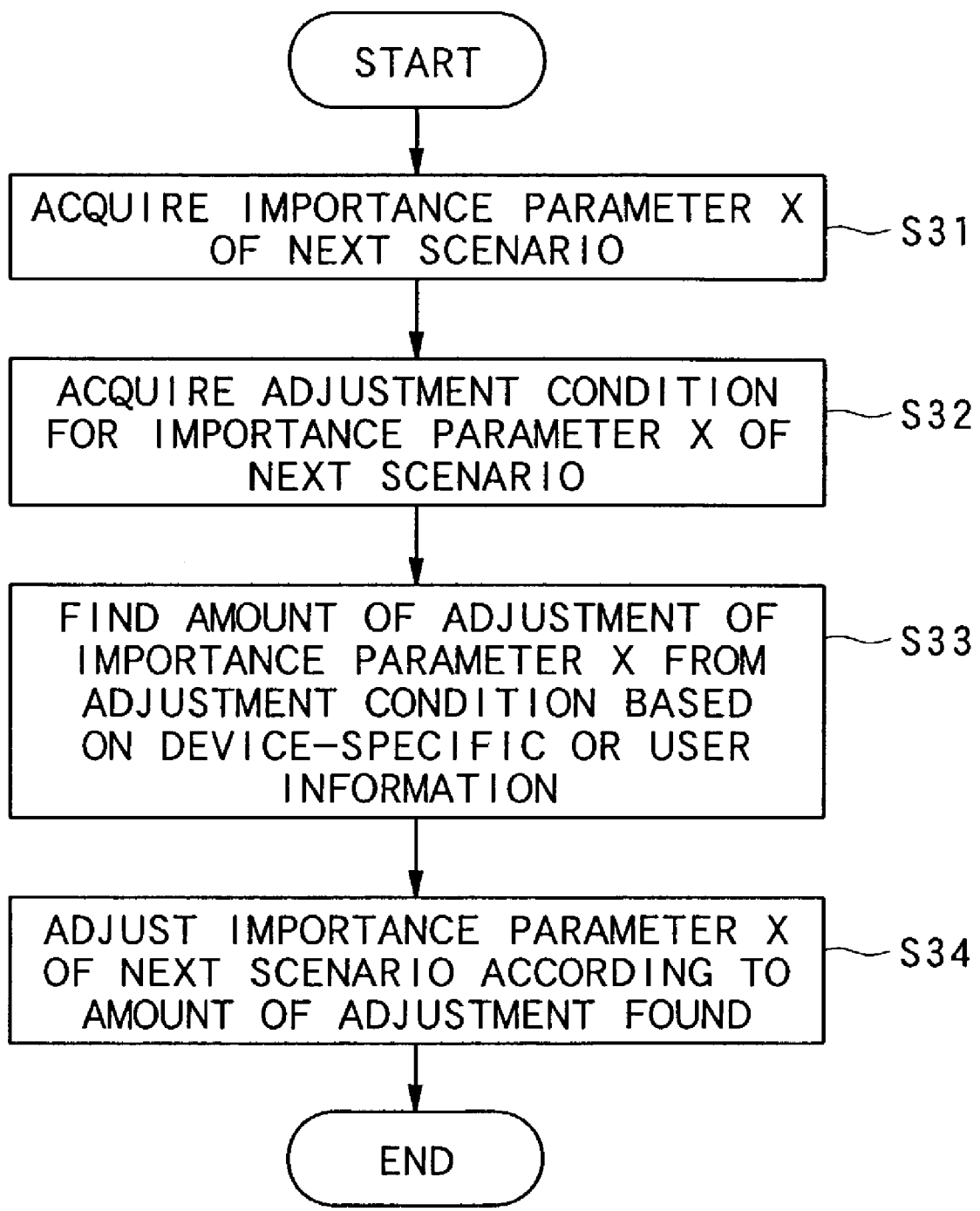
FIG. 10 is a flowchart for an importance parameter adjustment process of FIG. 7.

Turning now to FIGS. 7 through 10, an interaction control process executed by the interaction controller 10 will be described. FIG. 7 depicts a main routine. FIGS. 8 and 9 depict a subroutine for a normal process of FIG. 7 and a subroutine for a forced process of FIG. 7, respectively. FIG. 10 depicts a subroutine for an importance parameter adjustment process. It is to note that all the following processes are implemented by the interaction controller 10 executing pre-arranged interaction control programs to control various components within the in-vehicle information terminal 100.

In FIG. 7, first, upon start of navigation by the car navigation unit 1 of the in-vehicle information terminal 100 (step S1), the interaction controller 10 selects a scenario to be executed (step S2). The selection is made in accordance with conditions inside the vehicle, vocal commands from a user, etc. at the time the navigation is started. For example, for a user who has started driving without specifying a destination, the interaction controller 10 can choose a pre-set route searching/guidance scenario. Also, for a user requesting traffic information, restaurant information, etc., the controller 10 selects scenarios offering dialogues catering to such respective user requests.

Next, the interaction controller 10 retrieves the scenario selected in step S2 from the scenario DB 8, and compares the scenario's importance parameter value X with a pre-set importance parameter threshold IMP_THRESH (step S3). If the value X is greater than the threshold IMP_THRESH, the interaction controller 10, judging the scenario to be so important as to require relatively definite user responses, performs the normal interactive process (step S4). As earlier mentioned, the normal interactive process basically involves accurate recognition and appropriate confirmation of user's requests, which will be described in more detail below.

If, on the other hand, the importance parameter value X is smaller than the threshold IMP_THRESH, the interaction controller 10 invokes the forced interactive process, judging that the scenario should be carried forward resourcefully even with unclear or no user response (step S5). As mentioned previously, the forced interactive process allows a scenario to proceed based on some suitable, readily available information, such as user information and/or device-specific information, to cope with unclear user responses or no user response. Its details will also be described below.

When the processing of the scenario in the normal or forced manner ends, the interaction controller 10 then updates the user information DB 6 according to the responses received from the user during the processing (step S6).

Then, a determination is made as to whether or not there is a next scenario (step S7). This step is performed when a plurality of scenarios are to be played in a given sequence. If there is a next scenario (YES in step S7), that next scenario is fetched from the scenario DB 8, and its importance parameter is adjusted (step S8). The adjustment step involves changing the importance parameter value based on some importance parameter adjustment elements catalogued in FIG. 6, whose details will be described below.

When the importance parameter adjustment of this next scenario ends, the interaction controller 10 moves to a further next scenario (step S9). Hence, the process loops back to step S3 where the importance parameter X of the further next scenario is compared with the importance parameter threshold IMP_THRESH, and the interactive process is performed as instructed by the comparison result (steps S3 and S4 or S5).

One or more scenarios are executed in this way, and if there is no further scenario to continue the interaction (NO in step S7), the interaction controller 10 checks if the car navigation unit has finished its navigation process (step S10). If the navigation process is not yet finished, the process returns to step S2 and waits until a new scenario is selected. If the navigation process is finished as the user stops driving the vehicle, for example, then the interaction control process can end.

Referring now to a flowchart of FIG. 8, the normal interactive process in step S4 will be described. In FIG. 8, first, the interaction controller 10 commences a conversation with a user with an initial prompt and waits for a response from the user (step S11). Receiving a spoken input from the user (YES in step S12), the controller 10 recognizes it and decides if it is valid, i.e., the recognition result corresponds to any of planned words (step S13). If the input is valid, the controller 10 processes and responds to the input as requested by the user, and then chooses a next scenario (step S14). After this, the process returns to the main routine of FIG. 7.

If, on the other hand, the user remains silent (NO in step S12), or if the speech input received is not valid (NO in step S13), then the interaction controller 10 performs an invalid input process A to confirm the user response (step S15). This process A is to make the input speech clearer and more definite by, for example, asking the user the same question again, in a different way, or in such a way as to force an answer with "Yes" or "No", when there is no input or a received input is indefinite. Then, the interaction controller 10 checks how many times the invalid input process A is repeated (step S16). If the user responds still indefinitely even after the process A is repeated for predetermined times, then the interaction controller 10, judging this as a case for an invalid input process B, delivers a predetermined prompt designed to cope with vague and indecisive user responses, and selects a next scenario. After this, the process returns to the main routine shown in FIG. 7.

Referring then to a flowchart of FIG. 9, the forced interactive process in step S5 will be described. In FIG. 9, first, a determination is made as to whether or not a user input is required in order to execute a scenario, based on some user/device-specific information (step S21). In this step, reference is made to the user information or the device-specific information as to, for example, how the user has received the VICS information in the past (via FM broadcasting or a beacon, in text or graphics) to see if the controller 10 can execute that scenario without response from the user, but with reference to a record of past specifications made by the user, etc. The controller 10 also checks if it does need some user response in view of situations the user and/or the vehicle are presently involved in. For example, when the user is driving along an expressway, the controller 10 decides not to ask a question for safety.

If the past data logged as history information in the user/device-specific information DBs suffices, as in the above-mentioned scenario 3 (NO in step S22), the interaction controller 10 performs the forced interactive process. In other words, the user and/or device-specific information is used to push the scenario further in accordance with some voice prompts prepared for not requesting user input, and a next scenario will then be selected.

If, on the other hand, it is judged in step S22 that a user response is necessary, then the interaction controller 10 requests the user for an input (step S23). Then, the controller 10 receives an input, identifies it, and checks whether it is valid, i.e., the input is what is expected (step S24). If the user input is an expected one, the scenario is forcibly processed using that input (step S25). That is, the interaction controller 10 gives the user its response prompt back to that input received, and selects a subsequent scenario. It will be appreciated that a forced interactive process may become a normal interactive process in certain situations as in this example in which the controller 10 requests a user for an input and receives an expected input to continue interaction.

If the user input received is invalid (NO in step S24), the interaction controller 10 invokes a forced process for any invalid input (step S26), as in scenario 4 mentioned above (see FIG. 4), for example. In this situation, the interaction controller 10 requests the user for an input, issues some voice prompts prepared for any invalid input, and then chooses a next scenario. In other words, the interaction controller 10 handles the situation by proceeding to a next scenario as if it accepted an input from the user although the input is not valid.

As described above, as long as the importance parameter X of a next scenario is judged greater than the threshold IMP_THRESH, the scenario should be carried on strictly with decent user inputs. Hence, as shown in the normal interactive process of FIG. 8, the controller 10 executes the scenario via its appropriate processing and prompts on condition that it will receive clear user responses. If, on the other hand, the importance parameter X is judged smaller than the threshold IMP_THRESH, then the scenario should be executed resourcefully using the past user/device-specific information as well as in accordance with situations the user and/or the vehicle are involved in at the time the scenario is to be processed (i.e., it is important to some extent not to stop the processing of the scenario). Hence, in that case, the past data accumulated in the user information DB or the device-specific information DB, and the current situations involving the user and/or the vehicle are taken into account to push the scenario onward. Thus, the scenario-based interactive process is controlled according to the importance parameter, whereby the dialogue between the user and the car navigation unit can be maintained appropriately.

Adjustment Process of Importance Parameter

Referring now to FIG. 10, the process of adjusting an importance parameter will be described. When a next scenario is ready in step S7 of FIG. 7, the interaction controller 10 acquires the importance parameter X of that scenario (step S31). Since an importance parameter is set for each scenario in this embodiment as earlier mentioned, the interaction controller 10 retrieves the next scenario data from the scenario DB 8 to acquire its importance parameter X. Then, the controller 10 opts an importance parameter adjustment condition for the scenario from the correspondence table of FIG. 6 listing exemplary importance parameter adjustment elements (step S32). Since the importance parameter adjustment elements and conditions are defined for each intended use in the table, the importance parameter adjustment condition is opted from the table based on the intended use of a scenario to be played next.

Then, the interaction controller 10 finds an amount of adjustment, or an increment or a decrement, of the importance parameter according to the adjustment condition opted in step S32, with reference to relevant values included in the user information and device-specific information corresponding to the importance parameter adjustment elements shown in the table of FIG. 6 (the values including the current time and environmental factors such as seasons at the time the scenario is executed) (step S33). In one embodiment, how much the importance parameter value X is adjusted is calculated as follows. An index is provided for each importance parameter adjustment element of FIG. 6 as a kind of rate of contribution to changing an importance parameter value X, and these indexes are used to numerically represent information stored in the user information DB 6 and the device-specific information DB 7. Then, by computing these numerically represented information items in accordance with their opted importance parameter adjustment condition, the amount by which to adjust (increase or decrease) the importance parameter value X in question can be calculated. The interaction controller 10 then adjusts the importance parameter X of the next scenario according to the computed amount (step S34), and the process returns to the main routine shown in FIG. 7.

The interaction controller 10 adjusts, for a scenario, its importance parameter when actually playing that scenario, based on the scenario's pre-defined importance parameter adjustment elements and condition as mentioned above, whereby proper decision as to whether the controller 10 should proceed through the scenario under the normal interactive process or the pushed interactive process, can be made based on an importance parameter tailored to the current needs of the time when the dialogue is actually being carried on according to the scenario.

Next, how an importance parameter is adjusted will be described by way of example.

Example Importance Parameter Adjustment 1

Figure 11:
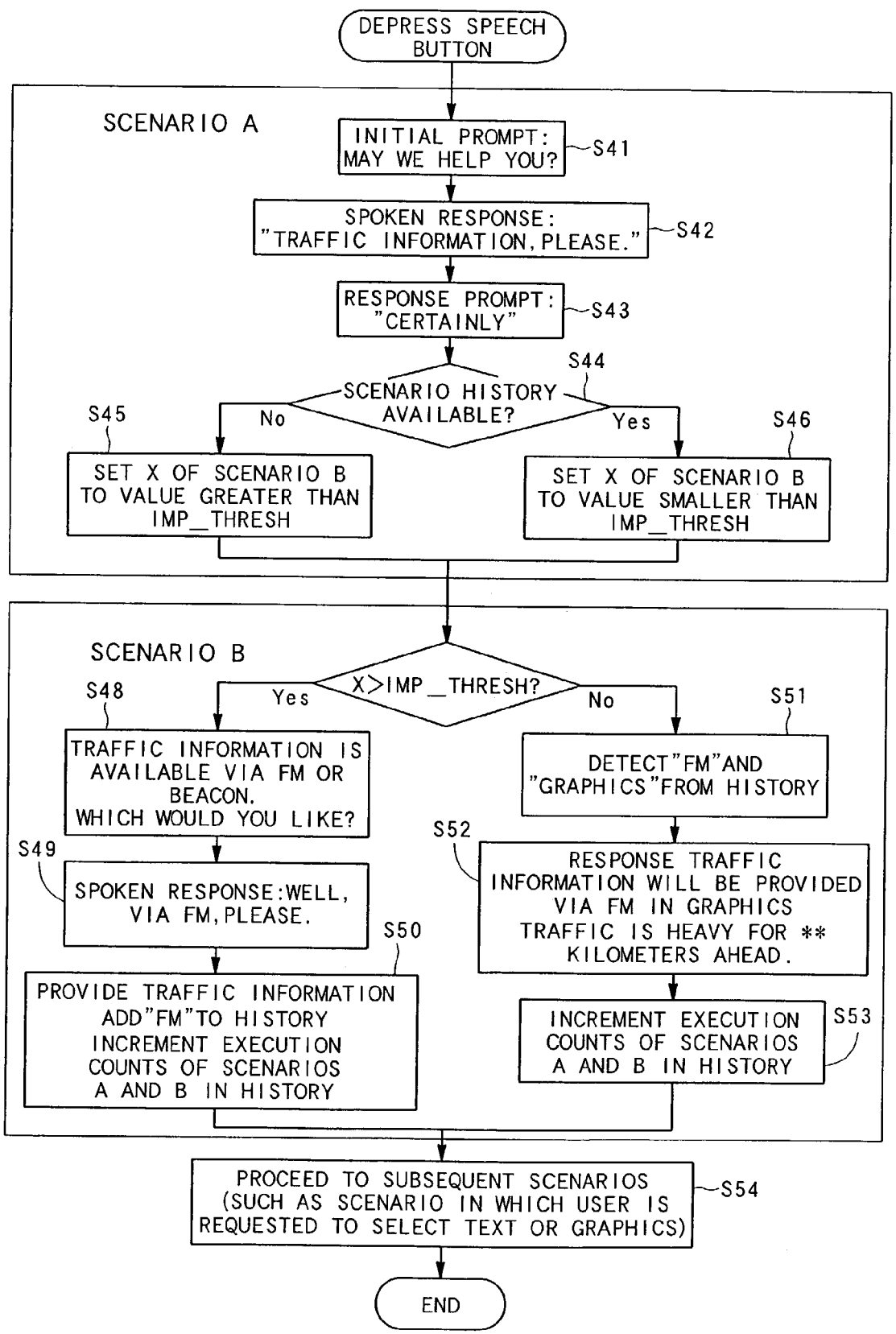
FIG. 11 is a flowchart for a first example of importance parameter adjustment.

FIG. 11 shows an example of importance parameter adjustment. This example refers to an adjustment made based on a scenario execution history. It should be noted that the importance parameter X of a scenario takes one of two values depending on whether or not that scenario has been executed in the past. Also, an importance parameter threshold IMP_THRESH is supposed to be set for each scenario.

First, the interaction controller 10 executes a scenario A by issuing an initial prompt to a user (step S41), receiving a response from the user to the effect that the user desires traffic information (step S42), and giving a response prompt back to the user by saying that the user will have the desired information provided (step S43). Then, the interaction controller 10 references the user information associated with that user to check if the scenario A has been executed in the past (step S44). If the scenario A has been executed in the past, the importance parameter X of a scenario B to be executed next is set to a value smaller than the importance parameter threshold IMP_THRESH of the scenario B (step S46). Otherwise, the controller 10 sets the importance parameter X of the scenario B to a value greater than its threshold IMP_THRESH (step S45).

Then, the interaction controller 10 executes the scenario B. That is, the importance parameter X of the scenario B is compared with its threshold IMP_THRESH (step S47), and if the parameter X is larger than the threshold IMP_THRESH, then the above-mentioned normal interactive process is invoked. Specifically, the controller 10 requests the user to specify how he or she wishes traffic information to be provided (step S48), and receives the specification from the user (step S49). Then, the controller 10 provides the user with the traffic information as specified by the user, records in the user's history the fact that the traffic information is acquired via FM radio and updates the scenario execution history by incrementing the execution counts of the scenarios A and B (step S50), and then moves to a next scenario (step S54).

On the other hand, if the importance parameter X is found to be smaller than the importance parameter threshold IMP_THRESH in step S47, then the above-mentioned forced interactive process is activated. That is, reference is made to the user information to search for his or her history data about traffic information providing methods (via FM radio in graphics) (step S51) with no request made to the user, and the traffic information is, provided in accordance with the referenced history data (step S52). Then, the execution counts for the scenarios A and B included in the user history is updated (step S53), and the process ends.

According to this example adjustment, the history information, if available, is utilized effectively to implement smooth interaction.

Example Importance Parameter Adjustment 2

Figure 12:
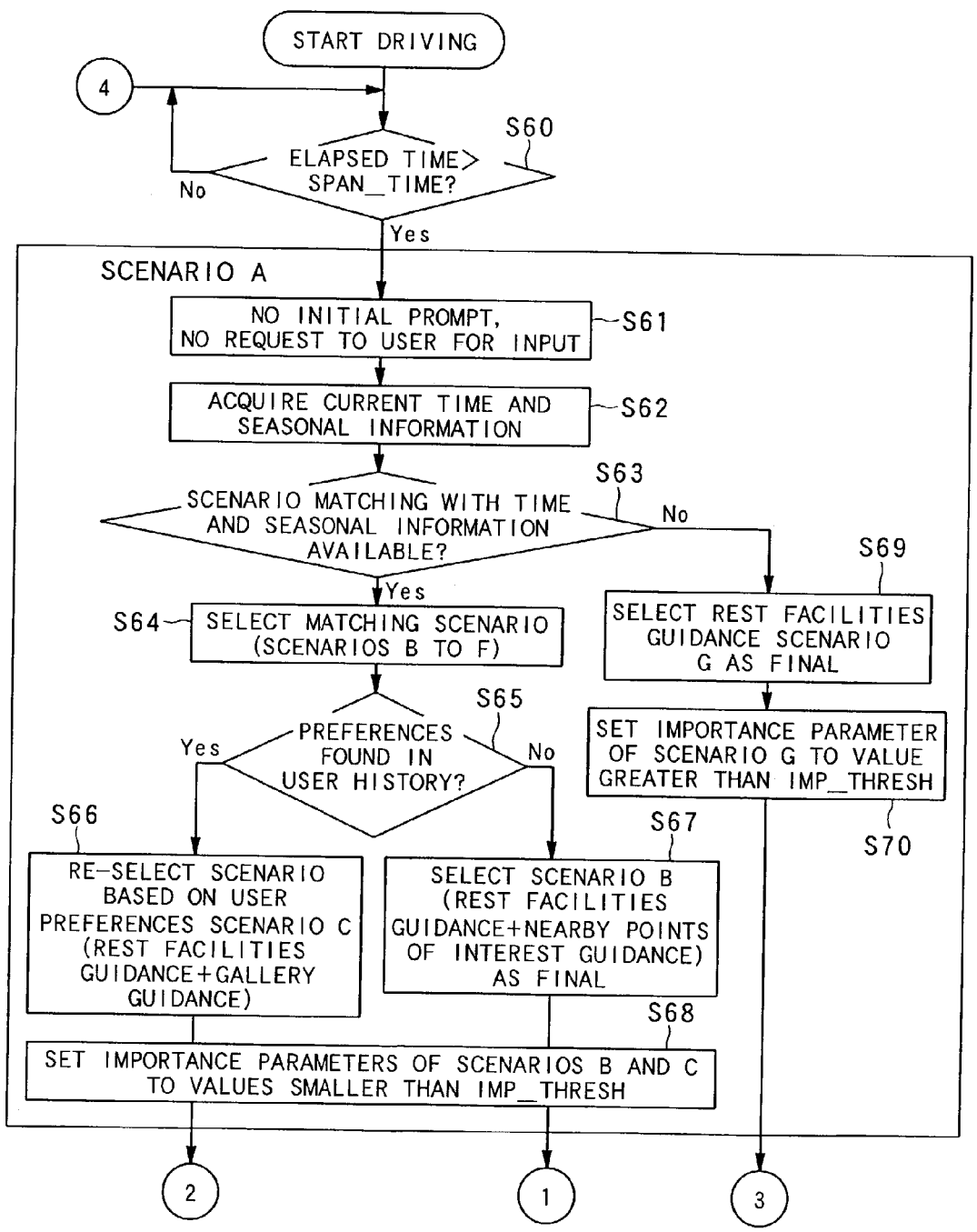
FIG. 12 is a flowchart for a second example of importance parameter adjustment.
Figure 13:
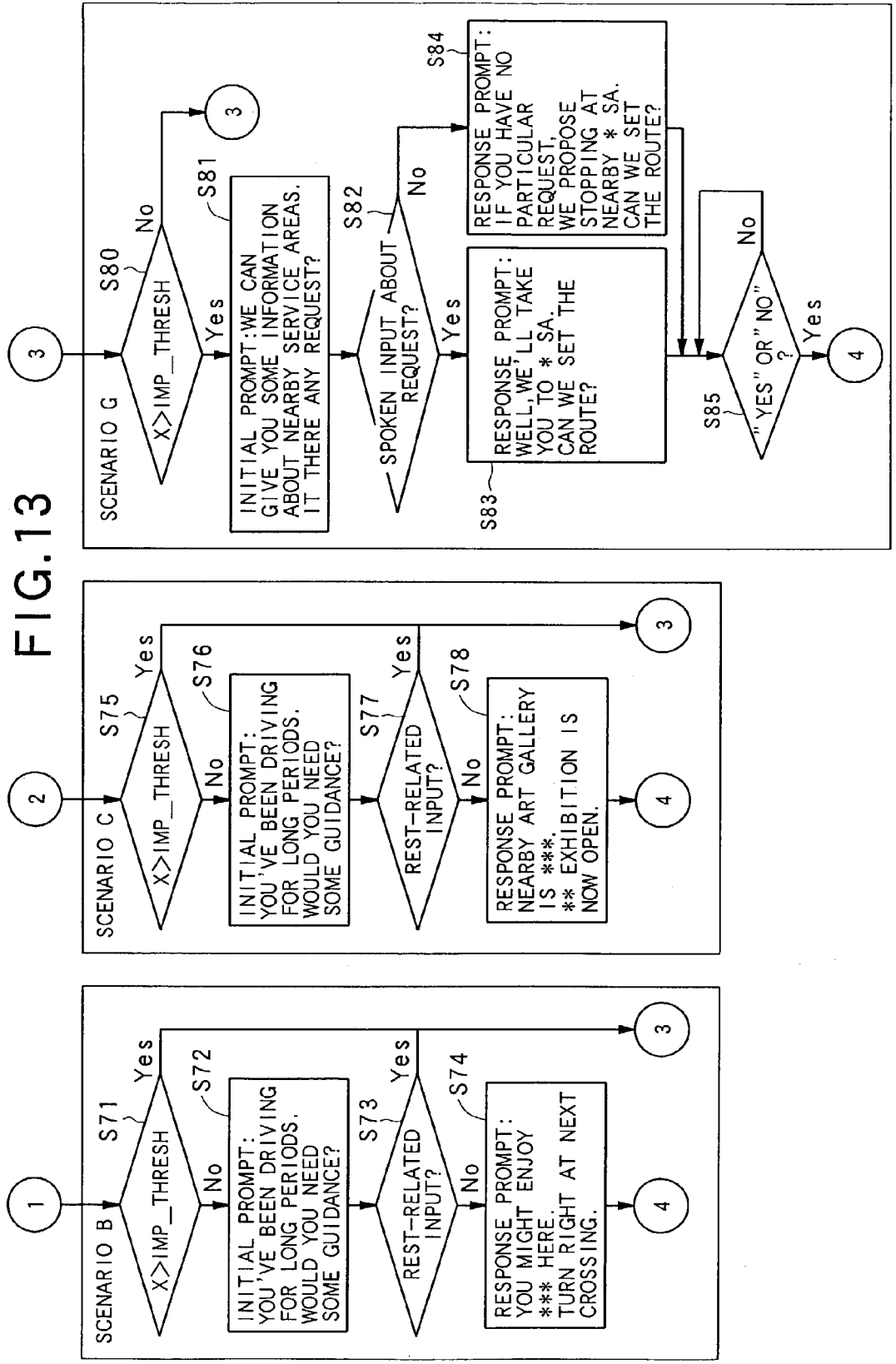
FIG. 13 shows other flowcharts for the second example of importance parameter adjustment.

Referring next to FIGS. 12 and 13, another example of importance parameter adjustment will be described. This example focuses on an adjustment technique using current time and seasonal information among the importance parameter adjustment elements enumerated in FIG. 6. It is to note that the importance parameter X also takes any of the two values.

First, when the time elapsed from a user's driving start event exceeds a maximum span time (SPAN_TIME) so far logged as a time interval from a user's driving start event to a user's first inquiry event (step S60), the interaction controller 10 begins to execute the scenario A with neither initial prompt nor request made to a user for input (step S61), and acquires the current time and seasonal information (step S62). Then, the controller 10 determines whether or not an information providing scenario is available that matches the acquired current time and seasonal information (step S63).

It is determined that such a scenario is available if an average relevant information availability rate is equal to or greater than a predetermined value, and such a scenario is determined unavailable otherwise. The average relevant information availability rate is obtained by dividing the total number of information items, such as times (daytime, night), seasons (red and yellow leaves in autumn, cherry blossoms in spring, etc.), information about travelling positions, etc., by the number of adjustment elements (such as time, season, etc.).

If any suitable scenario is found in step S63, the interaction controller 10 selects that scenario (step S64), and further looks for preference information included in the user information (step S65). If preference information is found, the controller 10 re-selects a scenario by reference to that preference information (step S66). In this example, a scenario C is finally selected. If preference information is not found, then the interaction controller 10 takes the selection made in step S64 as final (step S67). In this example, the scenario B is the final selection. Then, the controller 10 sets the importance parameters of the scenarios B and C to values below their importance parameter thresholds IMP_THRESH, respectively, and executes each scenario.

If no suitable information providing scenario is found available in step S63, the interaction controller 10 then selects, for example, a rest facilities guidance scenario G and confirms the selection (step S69), sets the importance parameter of the scenario G to a value greater than its importance parameter threshold IMP_THRESH (step S70), and then moves to that scenario for execution.

In the scenario B, the importance parameter is compared with its importance parameter threshold IMP_THRESH (step S71). If the importance parameter is smaller than the threshold, the interaction controller 10 plays an initial prompt (step S72), receives a vocal reply from the user, and determines whether the reply is related to resting or not (step S73). If not, the controller 10 suggests another guidance to the user (step S74), after which it loops back to step S60. If the importance parameter is larger than the threshold IMP_THRESH in step S71, the controller 10 moves to the scenario C. If receiving a rest-related response from the user in step S73 (YES in step S74), the controller 10, judging that the user is interested in resting, moves to the scenario G.

In the scenario C, a comparison is made between its importance parameter and its threshold IMP_THRESH (step S75), and when the importance parameter is smaller, the interaction controller 10 commences a dialogue with an initial voice prompt (step S76), receives a user response, and checks if it is a rest-related response (step S77). If it is not a rest-related response, the interaction controller 10 proposes another guidance to the user (step S78), and returns to step S60. If the importance parameter is greater than the threshold in step S71, the controller 10 moves to the scenario C. And if the user's response includes a rest-related word (YES in step S77), the controller 10, judging that the user is interested in some rest-related events, moves to the scenario G.

In the scenario G, a comparison is made between its importance parameter and its threshold IMP_THRESH (step S80). Since the importance parameter is larger than the threshold, the interaction controller 10 starts a conversation with the user by playing an initial prompt (step S81), receives a spoken response from the user, checks if the spoken response comprises an expected item (such as designating a rest area in this example) (step S82). If the spoken response comprises an expected item, the interaction controller 10 plays back a response prompt corresponding to the expected item to the user (step S83), and then requests the user to confirm it with "Yes" or "No" (step S85). If the user's spoken response is not related to the expected item in step S82, the interaction controller 10 gives the user a different response prompt to propose stopping over a nearby rest area (step S84), and then asks the user to confirm it with "Yes" or "No" (step S85). When receiving a confirmation (YES in step S85), the process loops back to step S60.

Example Importance Parameter Adjustment 3

Figure 14:
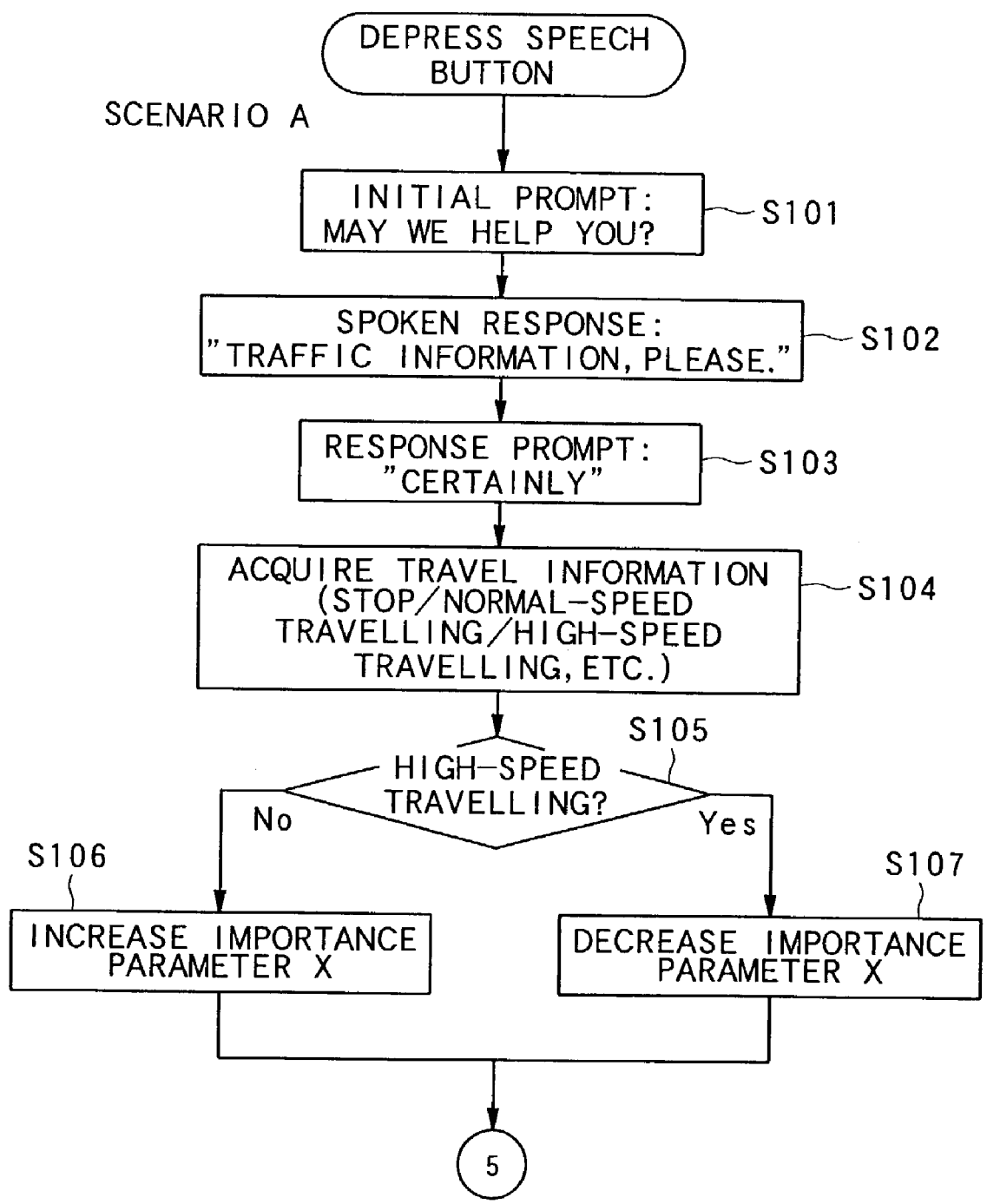
FIG. 14 is a flowchart for a third example of importance parameter adjustment.
Figure 15:
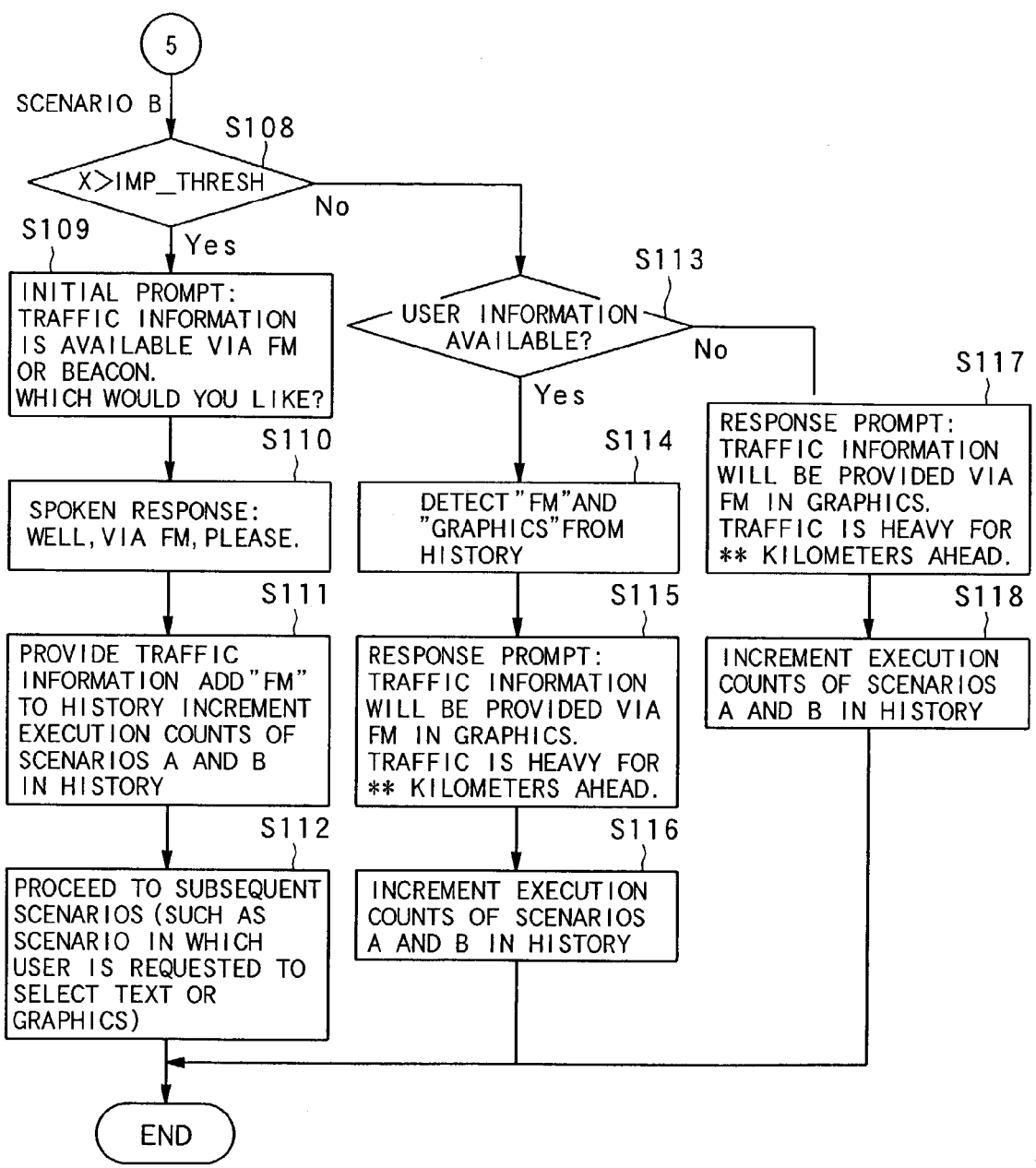
FIG. 15 is another flowchart for the third example of importance parameter adjustment.

Referring now to FIGS. 14 and 15, still another example of importance parameter adjustment will be described. In this example, adjustment is made according to travel information about a vehicle.

In FIG. 14, the interaction controller 10 executes the scenario A, in which it prompts the user to usher into a dialogue (step S101), receives a user input that requests traffic information (step S102), and returns its response prompt to the effect that traffic information will be provided (step S103). Then, the interaction controller 10 acquires travel information included in the device-specific information (step S104), and checks whether the vehicle is travelling at high speed (step S105). If the vehicle is travelling at high speed, the interaction controller 10 decreases the importance parameter X at given time intervals (step S107). Otherwise, the controller 10 increases the value X at given time intervals (step S106). That is, the further the vehicle is travelling fast, the more likely the scenario is forced to proceed, and the further the vehicle is travelling slowly, the less likely the scenario is forced to proceed. This is to prevent the driver from speaking during high-speed driving to ensure safety.

After such adjustment of the importance parameter to an extent proportional to high-speed travelling in this way, the scenario B is executed. First, if its importance parameter is found greater than its threshold IMP_THRESH (YES in step S108), the interaction controller 10 activates the normal interactive process. That is, the controller 10 requests the user to enter how he or she wishes traffic information to be supplied (step S109), receives an instruction from the user (step S lo l), and provides the user with the traffic information as requested. Additionally, the controller 10 adds to the user history the event that traffic information was provided via FM broadcasting, and then updates the user history by incrementing the execution counts of the scenarios A and B (step S111), and moves to a next scenario (step S112).

If, on the other hand, the importance parameter X is judged smaller than the threshold IMP_THRESH in step S108, the forced interactive process is invoked. Hence, the controller 10 checks whether history data as to traffic information providing methods is available (step S113). If available, the controller 10 reads the history data (i.e., via FM radio in graphics) in the user information with no request made to the user for any input (step S114), and provides congestion information according to the history data (step S115). Then, the controller 10 increments the execution counts of the scenarios A and B to update the user history (step S116), and brings the process to an end. If no method data is available (NO in step S113), the controller 10 provides the user with the congestion information according to a default method (step S117), updates the user history by incrementing the execution counts of the scenarios A and B (step S118), after which the process is terminated.

Thus, the above importance parameter adjustment which is based on travel information can ensure proper interaction under safe driving by, for example, minimizing the burden of input on the part of the user driving at high speed.

Example Importance Parameter Adjustment 4

Figure 16:
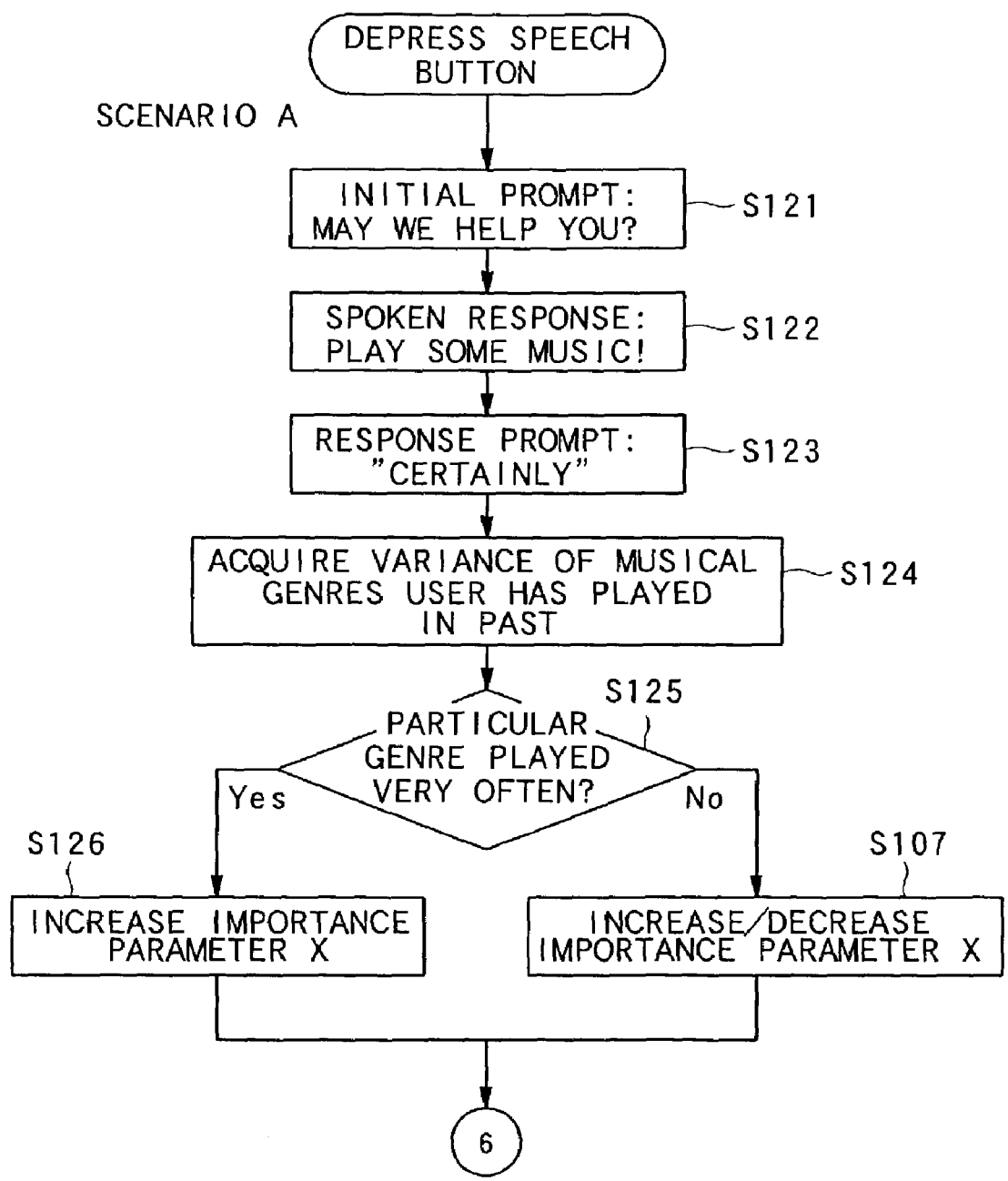
FIG. 16 is a flowchart for a fourth example of importance parameter adjustment.
Figure 17:
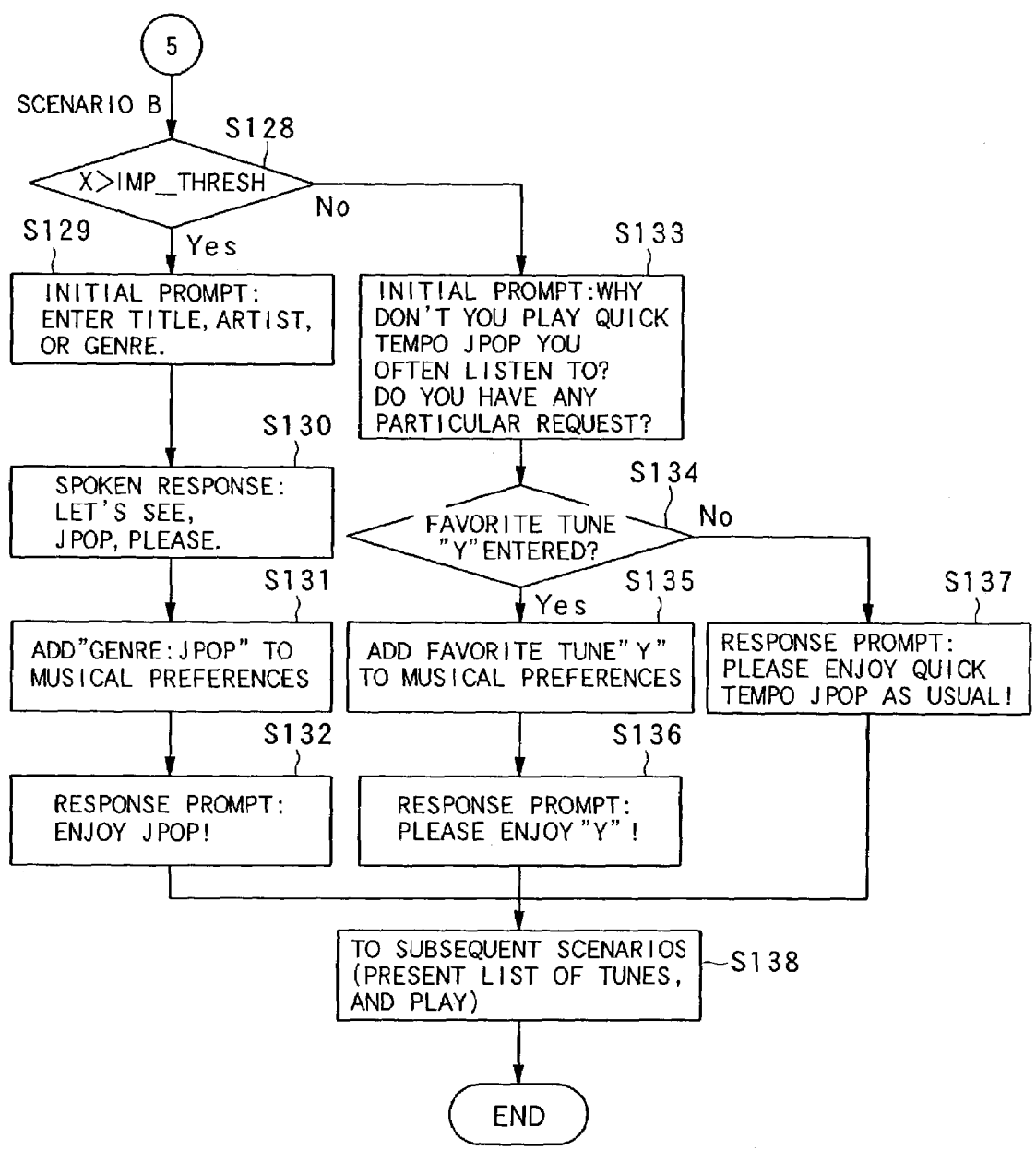
FIG. 17 is another flowchart for the fourth example of importance parameter adjustment.

Referring next to FIGS. 16 and 17, still another example of importance parameter adjustment will be described, which is made in accordance with history data included in user information.

In FIG. 16, the interaction controller 10 executes the scenario A, and to its initial prompt (step S121), receives a user's request for playing some music (step S122), and gives its response prompt to the effect that some music will be played (step S123). Next, the controller 10 finds a variance of musical genres the user has listened to in the past (step S124), and determines whether or not the frequency of the most frequently selected genre is distinctly higher than those of the other musical genres (step S125). If so, the importance parameter X is decreased (step S127); otherwise, it is increased (step S126). In this way, when the user shows a very high preference to a particular musical genre, the controller 10, assuming that the user would love that genre, picks up a piece of music from that genre. Otherwise, the controller 10 carries on a normal interaction to allow the user to specify his or her desired musical selection so that such desired musical selection can then be played.

Thus, after making a proper adjustment of its importance parameter according to the user's musical preference, the scenario B is executed. First, if its importance parameter is greater than its threshold IMP_THRESH (YES in step S128), the interaction controller 10 performs the normal interactive process. That is, the controller 10 requests the user to enter the title, artist, genre, etc. of a tune (step S129), receives these entries (step S130), updates the genre information recorded in the user information (step S131), and informs the user that the requested tune will be played (step S132).

On the other hand, if the importance parameter X is smaller than the threshold IMP_THRESH in step S128, the forced interactive process is performed. First, the controller 10 proposes some tunes the user would like to listen to by looking up the user's musical preference information (step S133), prompts the user to enter a desired tune (step S134), and adds the entered tune to the musical preference information in his or her user information (step S135), and informs the user that the desired tune will be played for the user (step S136). On the other hand, if the user does not enter any desired tune, the interaction controller 10 informs the user that it will play a tune that the controller 10 thinks he or she would prefer based on his or her user information (step S137). Then, the interaction controller 10 proceeds to a next scenario in which a list of musical selections is presented and one or more pieces of music will be played (step S138).

In this way, preference information included in user information is effectively used to adjust an importance parameter. When the user shows a distinctly high preference, information matching that preference is automatically selected and provided; otherwise, the user is requested to enter a desired bit of information so that the user can be provided with that desired bit of information without fail.

Modified Embodiments

While an importance parameter is set for each scenario in the above embodiments, the importance parameter may instead be specified for each state constituting a scenario.

While interaction control according to the invention is applied to an in-vehicle information terminal equipped with a car navigation unit in the above embodiments, the interaction control can be applied to other information terminals and AV equipment as well.

As described in the foregoing, according to the present invention, if any of the states forming an interactive operation of an information processing apparatus equipped with a mechanism for input/output of text, audio, video and other information greatly affects an operation of the apparatus, i.e., when the operation of the apparatus involves proper judgment of user inputs, then a user is strictly requested to make clear and reliable inputs according to instructions given by the apparatus. On the other hand, if any such state does not affect an operation of the apparatus so much, i.e., if the apparatus could properly operate as the user would like the apparatus to operate even with some unclear user inputs, and thus forced interactive operation would probably be beneficial, then the user would be allowed to make vague inputs. Consequently, according to the invention, two types of interactive processing can be used to suit the scenario, one strictly demanding clear user responses, and the other involving forced processing with vague user responses.

Furthermore, many users of an apparatus, such as a car navigation apparatus, which is rich in functions, often experience that they use only some of these functions due to their ignorance of the availability of these functions. However, according to the invention, appropriate forced processes of interactive scenarios, when used appropriately, support and guide users to fully utilize many useful functions of the apparatus so that the user can benefit from those rich functions.

The entire disclosure of Japanese Patent Application No. 2002-142192 filed on May 16, 2002 including the specification, claims, drawings and summary is incorporated herein by reference in its entirety.

What is claimed is:

1. An interactive information providing apparatus comprising:
    an output component that provides an information requesting output for requesting a user for information;
    an input component that receives from the user input information to the information requesting output; and
    an interaction controller component that controls the output component and the input component according to a scenario, to carry on a dialogue with the user,
    wherein the interaction controller component changes a level at which the output component requests a user for information, according to an importance parameter associated with the scenario, and
    wherein the importance parameter indicates how accurately and strictly the apparatus requests the user for information when the apparatus executes the scenario.

2. The interactive information providing apparatus according to claim 1, wherein the interaction controller component controls the output component such that the output component requests the user for more information when the importance parameter is above an importance parameter threshold than when the importance parameter is below the threshold.

3. The interactive information providing apparatus according to claim 1, wherein the interaction controller component controls the output component such that the output component provides the information requesting output more times when the importance parameter is above an importance parameter threshold than when the importance parameter is below the threshold.

4. The interactive information providing apparatus according to claim 1, wherein the input component comprises:
    a recognition device which recognizes the input information and outputs a recognition result;
    a decision device which determines whether or not the recognition result coincides with expected information prepared to correspond to the information requesting output; and
    a repeating device which causes the output component to repeat the information requesting output when the recognition result does not coincide with the expected information,
    wherein the interaction controller component increases a frequency at which the repeating device repeats the information requesting output, when the importance parameter is above an importance parameter threshold.

5. The interactive information providing apparatus according to claim 1, wherein the input component comprises:
    a recognition device which recognizes the input information and outputs a recognition result; and
    a decision device which determines whether or not the recognition result coincides with expected information prepared to correspond to the information requesting output,
    wherein the interaction controller component carries on the dialogue when the importance parameter is below an important parameter threshold, despite the recognition result not coinciding with the expected information.

6. The interactive information providing apparatus according to claim 1, wherein the interaction controller component carries on the dialogue when the importance parameter is below an importance parameter threshold, despite the input component receiving no input information from the user.

7. The interactive information providing apparatus according to claim 1, further comprising:
   a first storage component that stores, as user information, input information to the information requesting output, entered by the user in the past; and
   a second storage component that stores device-specific information related to a condition of the information providing apparatus,
   wherein the interaction controller carries on the dialogue based on at least one of the user information and the device-specific information.

8. The interactive information providing apparatus according to claim 7, wherein the interaction controller component changes a degree to which the dialogue is carried on based on at least one of the user information and the device-specific information, when the importance parameter is below an importance parameter threshold.

9. The interactive information providing apparatus according to claim 1, further comprising:
   a first storage component that stores, as user information, input information to the information requesting output, entered by the user in the past;
   a second storage component that stores device-specific information related to a condition of the information providing apparatus; and
   an adjustment device which adjusts a value of the importance parameter based on at least one of the user information and the device-specific information.

10. The interactive information providing apparatus according to claim 9, wherein the adjustment device adjusts the value of the importance parameter according to a frequency at which the dialogue has been carried on according to the scenario in the past.

11. The interactive information providing apparatus according to claim 7, further comprising a navigation unit,
    wherein the user information comprises input information entered by the user to the navigation unit, and
    the device-specific information comprises current time data, current position data, and travel history data.

12. A computer-readable storage medium having stored therein an interactive information providing program executable by a computer, the program causing the computer to function as:
    an output component that provides an information requesting output for requesting a user for information;
    an input component that receives from the user input information to the information requesting output; and
    an interaction controller component that controls the output component and the input component according to a scenario, to carry on a dialogue with the user,
    wherein the interaction controller component changes a level at which the output component requests a user for information, according to an importance parameter associated with the scenario, and
    wherein the importance parameter indicates how accurately and strictly the apparatus requests the user for information when the apparatus executes the scenario.

13. An in-vehicle apparatus, comprising:
    an output component that requests information from a user;
    an input component that receives user response to the request; and
    an interaction controller that controls the output component and the input component in accordance with a scenario,
    wherein the interaction controller compares an importance parameter associated with the scenario to an importance parameter threshold to regulate, based at least in part on the comparing, a content of an information request and a required clarity of response for the information request.

14. The in-vehicle apparatus according to claim 13, wherein the importance parameter associated with a particular scenario varies based on user information.

15. The in-vehicle apparatus according to claim 13, wherein the importance parameter associated with a particular scenario varies based on apparatus-specific information.

16. The in-vehicle apparatus according to claim 13, wherein the importance parameter associated with a particular scenario varies based on time of day.

17. The in-vehicle apparatus according to claim 13, wherein the importance parameter associated with a particular scenario varies based on season.

18. The in-vehicle apparatus according to claim 13, wherein the importance parameter associated with a particular scenario varies based on vehicle speed.

* * * * *